United States Patent
Moonjelly et al.

(10) Patent No.: US 9,567,936 B2
(45) Date of Patent: *Feb. 14, 2017

(54) PROCESSING SYSTEM AND METHOD FOR CALCULATING PRESSURE DECREASES DUE TO INJECTION EVENTS IN A HIGH-PRESSURE FUEL SYSTEM

(71) Applicant: CUMMINS INC., Columbus, IN (US)

(72) Inventors: Paul V. Moonjelly, Columbus, IN (US); David Lee Baldwin, Columbus, IN (US); David M. Carey, Greenwood, IN (US); Donald J. Benson, Columbus, IN (US)

(73) Assignee: Cummins Inc., Columbus, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/865,982

(22) Filed: Sep. 25, 2015

(65) Prior Publication Data

US 2016/0010584 A1  Jan. 14, 2016

Related U.S. Application Data

(63) Continuation of application No. 13/763,523, filed on Feb. 8, 2013, now Pat. No. 9,169,784.

(51) Int. Cl.
| | |
|---|---|
| *F02D 41/38* | (2006.01) |
| *F02D 1/06* | (2006.01) |
| *F02M 65/00* | (2006.01) |
| *F02M 63/02* | (2006.01) |
| *G01M 15/09* | (2006.01) |

(Continued)

(52) U.S. Cl.
CPC ............ *F02D 41/3845* (2013.01); *F02D 1/06* (2013.01); *F02M 63/023* (2013.01); *F02M 63/0225* (2013.01); *F02M 63/0265* (2013.01); *F02M 65/003* (2013.01); *G01M 15/09* (2013.01); *F02D 2041/225* (2013.01); *F02D 2041/286* (2013.01); *F02D 2200/0602* (2013.01); *F02D 2200/0616* (2013.01); *F02D 2250/14* (2013.01)

(58) Field of Classification Search
CPC .... F02D 41/3845; F02D 1/06; F02D 2250/14; F02D 2041/286; F02D 2041/225; F02D 2200/0616; F02D 2200/0602; F02M 63/023; F02M 63/0265; F02M 63/0225; F02M 65/003; G01M 15/09
See application file for complete search history.

(56) References Cited

U.S. PATENT DOCUMENTS

| | | |
|---|---|---|
| 5,535,621 A | 7/1996 | Glidewell et al. |
| 6,557,530 B1 | 5/2003 | Benson et al. |
| 6,567,758 B1 | 5/2003 | Wuori |

(Continued)

*Primary Examiner* — Hung Q Nguyen
*Assistant Examiner* — Xiao Mo
(74) *Attorney, Agent, or Firm* — Faegre Baker Daniels LLP

(57) ABSTRACT

A system and method is provided to analyze an intermediate pressure signal portion between an end of an injection event signal portion and a start of a subsequent injection event signal portion. The analysis is simplified by identifying a plurality of single cycle windows and calculating a single value, such as a mean or a median, for each of the windows. An intermediate portion single value is determined by averaging the single values for each of the windows. The intermediate portion single value may then be used to identify pumping events or leakage errors that occur during the intermediate pressure signal portion that affect further analysis of the intermediate pressure signal portion.

24 Claims, 13 Drawing Sheets

(51) Int. Cl.
F02D 41/22 (2006.01)
F02D 41/28 (2006.01)

(56) References Cited

U.S. PATENT DOCUMENTS

| | | |
|---|---|---|
| 6,675,638 B2 | 1/2004 | Pfitz |
| 7,188,608 B2 | 3/2007 | Wilson et al. |
| 7,606,655 B2 | 10/2009 | Husted et al. |
| 7,788,015 B2 | 8/2010 | Geveci et al. |
| 8,100,112 B2 | 1/2012 | Nakata et al. |
| 2010/0250102 A1 | 9/2010 | Imai et al. |

PROCESSING SYSTEM AND METHOD FOR CALCULATING PRESSURE DECREASES DUE TO INJECTION EVENTS IN A HIGH-PRESSURE FUEL SYSTEM

CROSS-REFERENCE TO RELATED APPLICATIONS

This application is a continuation of and claims priority from U.S. patent application Ser. No. 13/763,523 entitled "Processing System And Method For Calculating Pressure Decreases Due To Injection Events In A High-Pressure Fuel System", filed on Feb. 8, 2013, said priority application incorporated herein by reference in its entirety.

TECHNICAL FIELD

This disclosure relates to a system and method for analyzing pressure data signals from a fuel accumulator of an internal combustion engine.

BACKGROUND

As with all mechanical devices, fuel injectors have physical dimensions that lead to variations between fuel injectors. In addition, each fuel injector has different rates of wear and responds to temperature changes differently. Since the fuel delivered by each fuel injector during a fuel injection event varies enough to affect the performance of an associated engine, it is useful to measure or calculate the fuel delivery by each fuel injector. One challenge with these measurements and calculations is verifying the data is unaffected by non-injection events, such as pumping of fuel and leakage.

SUMMARY

This disclosure provides a fuel system for an internal combustion engine, the system comprising a fuel accumulator, a sensor, a plurality of fuel injectors, and a control system. The fuel accumulator is positioned to receive a fuel flow. The sensor is adapted to detect a fuel pressure in the fuel accumulator and to transmit a fuel pressure signal indicative of the fuel pressure in the fuel accumulator. Each fuel injector of the plurality of fuel injectors is adapted to receive an injection signal and operable to deliver a quantity of fuel from the fuel accumulator to one of a plurality of combustion chambers in response to the injection signal, the delivery of fuel by each fuel injector forming an injection event. The fuel pressure signal includes a first injection event signal portion, a second injection event signal portion, and a first intermediate pressure signal portion extending from an end of the first injection event signal portion to a beginning of the second injection event signal portion, the first intermediate pressure signal portion having a frequency that includes a wavelength. The control system is adapted to generate a control signal to command a stop of the fuel flow to the accumulator, to receive the fuel pressure signal, and to divide the first intermediate pressure signal portion into a plurality of contiguous single cycle windows. Each single cycle window is equal in width and a total width of the plurality of single cycle windows is equal to an integer number of wavelengths. The control system is adapted to calculate a mean pressure for each one of the plurality of single cycle windows, and to calculate a first mean pressure for the first intermediate pressure signal portion based on at least two single cycle window mean pressures.

This disclosure also provides a fuel system for an internal combustion engine, the system comprising a fuel accumulator, a sensor, a plurality of fuel injectors, and a control system. The fuel accumulator is positioned to receive a fuel flow. The sensor is adapted to detect a fuel pressure in the fuel accumulator and to transmit a fuel pressure signal indicative of the fuel pressure in the fuel accumulator. Each fuel injector is adapted to receive an injection signal and operable to deliver a quantity of fuel from the fuel accumulator to one of a plurality of combustion chambers in response to the injection signal, the delivery of fuel by each fuel injector forming an injection event. The fuel pressure signal includes a first injection event signal portion, a second injection event signal portion, and a first intermediate pressure signal portion extending from an end of the first injection event signal portion to a beginning of the second injection event signal portion, the first intermediate pressure signal portion having a frequency that includes a wavelength. The control system is adapted to generate a control signal to command a stop of the fuel flow to the accumulator, to receive the fuel pressure signal, and to divide the first intermediate pressure signal portion into a plurality of contiguous single cycle windows. Each single cycle window is equal to one wavelength. The control system is adapted to calculate a first mean pressure for a first two single cycle windows positioned at a beginning of the first intermediate pressure signal portion and to calculate a second mean pressure for a last two single cycle windows at an end of the first intermediate pressure signal portion. The control system is further adapted to calculate a first intermediate pressure signal portion mean pressure by averaging the first mean pressure and the second mean pressure.

This disclosure also provides a method of identifying events in a fuel system for an internal combustion engine. The method comprises providing a fuel flow to a fuel accumulator, delivering fuel from the fuel accumulator during an injection event, and transmitting a control signal to stop the fuel flow to the fuel accumulator to define a beginning of a termination event. The method further comprises detecting a fuel pressure in the fuel accumulator during the termination event and providing a fuel pressure signal indicative of the fuel pressure, the fuel pressure signal including a frequency having a wavelength. The method further comprises analyzing a first intermediate pressure signal portion between a first injection event signal portion and a second injection event signal portion by dividing the first intermediate pressure signal portion into a plurality of contiguous single cycle windows. Each single cycle window has a width equal to one wavelength. The control system then calculates a single value pressure representing pressure for each one of the single cycle windows, and calculates a first intermediate pressure for the first intermediate pressure signal portion based on at least two single cycle window single value pressures.

This disclosure also provides a fuel system for an internal combustion engine, the system comprising a fuel accumulator, a sensor, a plurality of fuel injectors, and a control system. The fuel accumulator is positioned to receive a fuel flow. The sensor is adapted to detect a fuel pressure in the fuel accumulator and to transmit a fuel pressure signal indicative of the fuel pressure in the fuel accumulator. Each fuel injector of the plurality of fuel injectors is adapted to receive an injection signal and operable to deliver a quantity of fuel from the fuel accumulator to one of a plurality of combustion chambers in response to the injection signal, the delivery of fuel by each fuel injector forming an injection event. The fuel pressure signal includes a first injection event signal portion, a second injection event signal portion, and a first intermediate pressure signal portion extending from an end of the first injection event signal portion to a beginning of the second injection event signal portion, the first intermediate pressure signal portion having a frequency that includes a wavelength. The control system is adapted to receive the fuel pressure signal, and to divide the first intermediate pressure signal portion into a plurality of contiguous single cycle windows, each single cycle window being equal in width and a total width of the plurality of single cycle windows being equal to an integer number of wavelengths. The control system is further adapted to calculate a mean pressure for each one of the plurality of single cycle windows, and to calculate a first mean pressure for the first intermediate pressure signal portion based on at least two single cycle window mean pressures.

Advantages and features of the embodiments of this disclosure will become more apparent from the following detailed description of exemplary embodiments when viewed in conjunction with the accompanying drawings.

DETAILED DESCRIPTION

Figure 1:
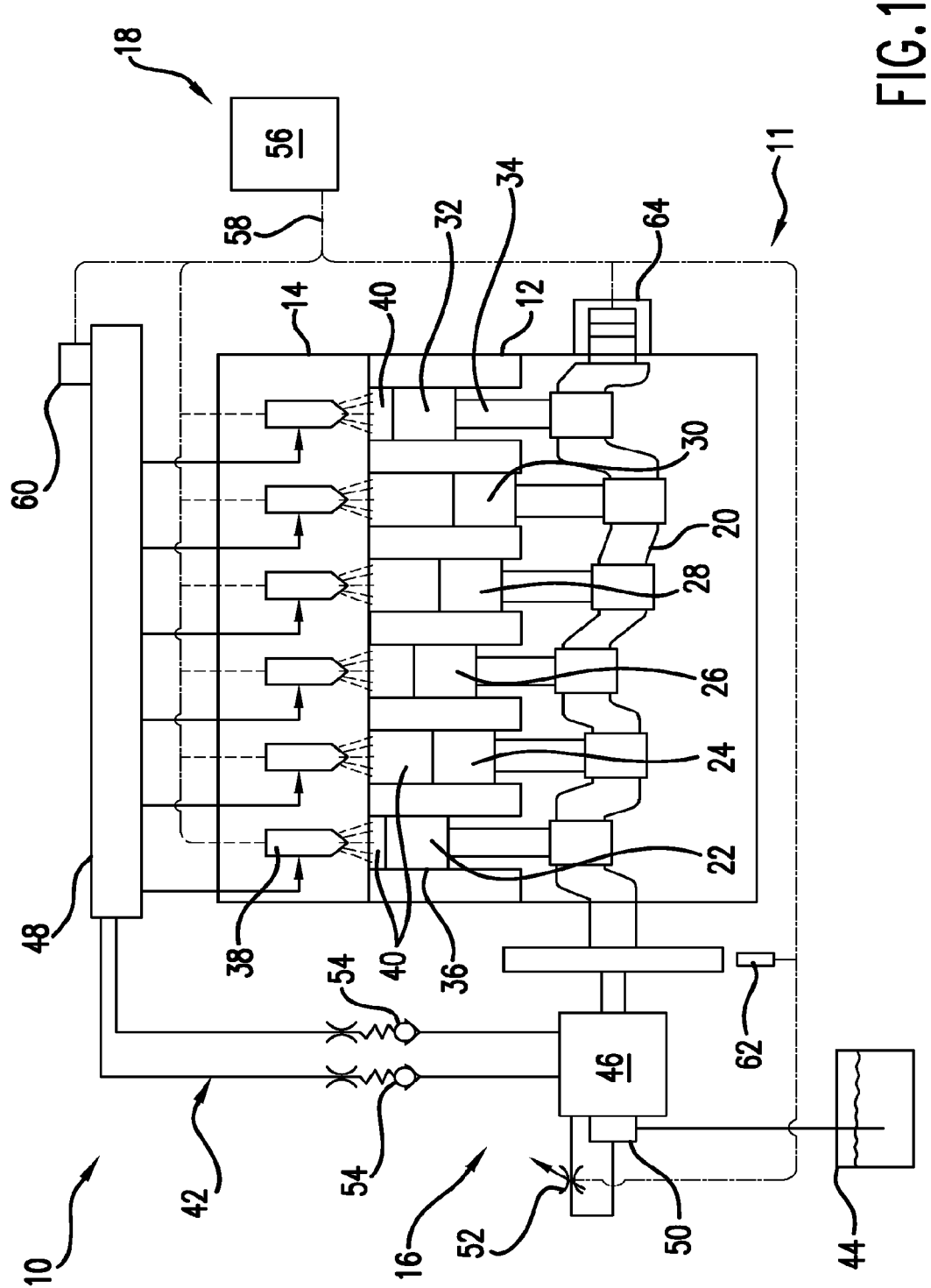
FIG. 1 is a schematic of an internal combustion engine incorporating an exemplary embodiment of the present disclosure.

Referring to FIG. 1, a portion of a conventional internal combustion engine is shown as a simplified schematic and generally indicated at 10. Engine 10 includes an engine body 11, which includes an engine block 12 and a cylinder head 14 attached to engine block 12, a fuel system 16, and a control system 18. Control system 18 receives signals from sensors located on engine 10 and transmits control signals to devices located on engine 10 to control the function of those devices, such as one or more fuel injectors.

One challenge with fuel injectors is that they have a measure of variability from injector to injector. In addition, the temperature of a fuel injector and wear of components in a fuel injector may cause additional variation in fuel quantity delivered by an individual injector during a fuel injection event. The variation in fuel quantity delivered causes undesirable variations in output power in engine 10 and causes undesirable variation in emissions, e.g., NOX and CO. In order to combat these undesirable effects, techniques of measuring fuel delivery by each fuel injector have been developed. However, these techniques have their own undesirable side effects.

One technique that avoids the use of individual flow measurements is to measure the pressure decrease in a fuel accumulator while fuel flow to the fuel accumulator is stopped for a specific time. However, this technique can lead to an undesirable decrease in fuel pressure in the fuel accumulator. Another technique is to halt fuel flow to the accumulator until the fuel pressure in the accumulator decreases by a predetermined or specific amount. One challenge with these techniques is the acquisition of the most data points possible. If fuel flow is stopped at the wrong time, valuable data that might be acquired will need to be discarded because there is insufficient time to determine whether the data meets predetermined requirements. Control system 18 is able to determine either the crank angle and/or time required for fuel system 16 to stop the flow of fuel to the accumulator of fuel system 16 after fuel system 16 receives a fuel flow cutout command to stop fuel flow. The time between transmission of the cutout command to stop fuel flow to the accumulator of fuel system 16 and time fuel flow actually stops flowing into the accumulator may be called a fuel flow cutout lead angle, delay, or time. The term "cutout" in this disclosure corresponds to shutoff, stoppage, or stopping of fuel flow to the fuel accumulator. By knowing the fuel flow cutout lead angle, delay, or time, the termination of fuel flow to the accumulator of fuel system 16 may be arranged in advance of a predetermined crank angle to obtain the maximum number of useful data points from a fuel pressure sensor associated with the fuel accumulator. While the fuel flow to the fuel accumulator is stopped, which forms a termination event, control system 18 receives signals from the pressure sensor associated with the fuel accumulator indicative of the fuel pressure in the fuel accumulator.

Once fuel pressure data has been acquired from the fuel pressure sensor, the next challenge is to analyze the data rapidly to determine whether the data is affected by a pumping event. If the data is unaffected by a pumping event, the data requires further analysis to determine the pressure decreases that occur during measured fuel injection events. Additionally, the fuel pressure data may be analyzed for anomalous leakage conditions indicative of a malfunction of fuel system 16. Control system 18 includes a simple and effective process to analyze fuel pressure data, a process that may be described as computationally light because the process requires minimal processing capability. The process is also fault tolerant in that the process has the capability of identifying certain faults in the fuel system and in some cases accounting for the faults in the analysis process.

In the exemplary embodiment, engine body 12 includes a crank shaft 20, a #1 piston 22, a #2 piston 24, a #3 piston 26, a #4 piston 28, a #5 piston 30, a #6 piston 32, and a plurality of connecting rods 34. Pistons 22, 24, 26, 28, 30, and 32 are positioned for reciprocal movement in a plurality of engine cylinders 36, with one piston positioned in each engine cylinder 36. One connecting rod 34 connects each piston to crank shaft 20. As will be seen, the movement of the pistons under the action of a combustion process in engine 10 causes connecting rods 34 to move crankshaft 20.

In the exemplary embodiment, a plurality of fuel injectors 38 is positioned within cylinder head 14. Each fuel injector 38 is fluidly connected to a combustion chamber 40, each of which is formed by one piston, cylinder head 14, and the portion of engine cylinder 36 that extends between the piston and cylinder head 14. While the exemplary embodiment includes a plurality of pistons, combustion chambers 40, and fuel injectors 38, the system and method of the present disclosure operates with a single fuel injector 38 providing fuel to a single combustion chamber 40.

Fuel system 16 provides fuel to injectors 38, which is then injected into combustion chambers 40 by the action of fuel injectors 38, forming one or more injection events. Fuel system 16 includes a fuel circuit 42, a fuel tank 44, which contains a fuel, a high-pressure fuel pump 46 positioned along fuel circuit 42 downstream from fuel tank 44, and a fuel accumulator or rail 48 positioned along fuel circuit 42 downstream from high-pressure fuel pump 46. In the exemplary embodiment, fuel accumulator 48 is shown as a single device, which is advantageous because it reduces the amplitude of system pressure oscillations, such as those shown in FIG. 8. However, in some fuel systems the elements that contain high-pressure fuel, including the fuel injector(s) 38, high-pressure pump 46, any fuel lines, pipes, hoses, and the like, may serve to function as fuel accumulator 48, and a separate fuel accumulator 48 may thus be unnecessary. The pressure sensor may be positioned anywhere along fuel circuit 42 containing the high-pressure that feeds fuel injectors 38.

Fuel system 16 also includes an inlet metering valve 52 positioned along fuel circuit 42 upstream from high-pressure fuel pump 46 and one or more outlet check valves 54 positioned along fuel circuit 42 downstream from high-pressure fuel pump 46 to permit one-way fuel flow from high-pressure fuel pump 46 to fuel accumulator 48. Inlet metering valve 52 has the ability to vary or shut off fuel flow to high-pressure fuel pump 46, which thus shuts off or stops fuel flow to fuel accumulator 48. Fuel circuit 42 connects fuel accumulator 48 to fuel injectors 38, which receive fuel from fuel circuit 42 and then provide controlled amounts of fuel to combustion chambers 40. Fuel system 16 may also include a low-pressure fuel pump 50 positioned along fuel circuit 42 between fuel tank 44 and high-pressure fuel pump 46. Low-pressure fuel pump 50 increases the fuel pressure to a first pressure level prior to fuel flowing into high-pressure fuel pump 46, which increases the efficiency of operation of high-pressure fuel pump 46.

Control system 18 may include a control module 56 and a wire harness 58. Many aspects of the disclosure are described in terms of sequences of actions to be performed by elements of a computer system or other hardware capable of executing programmed instructions, for example, a general-purpose computer, special purpose computer, workstation, or other programmable data process apparatus. It will be recognized that in each of the embodiments, the various actions could be performed by specialized circuits (e.g., discrete logic gates interconnected to perform a specialized function), by program instructions (software), such as program modules, being executed by one or more processors (e.g., one or more microprocessors, a central processing unit (CPU), and/or application specific integrated circuit), or by a combination of both. For example, embodiments can be implemented in hardware, software, firmware, microcode, or any combination thereof. The instructions can be program code or code segments that perform necessary tasks and can be stored in a machine-readable medium such as a storage medium or other storage(s). A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

The non-transitory machine-readable medium can additionally be considered to be embodied within any tangible form of computer readable carrier, such as solid-state memory, magnetic disk, and optical disk containing an appropriate set of computer instructions, such as program modules, and data structures that would cause a processor to carry out the techniques described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (e.g., EPROM, EEPROM, or Flash memory), or any other tangible medium capable of storing information. It should be noted that the system of the present disclosure is illustrated and discussed herein as having various modules and units that perform particular functions.

It should be understood that these modules and units are merely schematically illustrated based on their function for clarity purposes, and do not necessarily represent specific hardware or software. In this regard, these modules, units and other components may be hardware and/or software implemented to substantially perform their particular functions explained herein. The various functions of the different components can be combined or segregated as hardware and/or software modules in any manner, and can be useful separately or in combination. Input/output or I/O devices or user interfaces including, but not limited to, keyboards, displays, pointing devices, and the like can be coupled to the system either directly or through intervening I/O controllers. Thus, the various aspects of the disclosure may be embodied in many different forms, and all such forms are contemplated to be within the scope of the disclosure.

In the exemplary embodiment, control system 18 also includes an accumulator pressure sensor 60 and a crank angle sensor. Other devices may be used in place of pressure sensor 60 that provide an output that varies with pressure, such as a force sensor or transducer, a strain gauge, or other device that operates in a similar manner for the purposes detailed in this disclosure. The crank angle sensor may be a toothed wheel sensor 62, a rotary Hall sensor 64, or other type of device capable of measuring the rotational angle of crankshaft 20. Control system 18 uses signals received from accumulator pressure sensor 60 and the crank angle sensor to determine the combustion chamber receiving fuel, which is then used to analyze the signals received from accumulator pressure sensor 60, described in more detail hereinbelow.

Control module 56 may be an electronic control unit or electronic control module (ECM) that may monitor conditions of engine 10 or an associated vehicle in which engine 10 may be located. Control module 56 may be a single processor, a distributed processor, an electronic equivalent of a processor, or any combination of the aforementioned elements, as well as software, electronic storage, fixed lookup tables and the like. Control module 56 may include a digital or analog circuit. Control module 56 may connect to certain components of engine 10 by wire harness 58, though such connection may be by other means, including a wireless system. For example, control module 56 may connect to and provide control signals to inlet metering valve 52 and to fuel injectors 38.

When engine 10 is operating, combustion in combustion chambers 40 causes the movement of pistons 22, 24, 26, 28, 30, and 32. The movement of pistons 22, 24, 26, 28, 30, and 32 causes movement of connecting rods 34, which are drivingly connected to crankshaft 20, and movement of connecting rods 34 causes rotary movement of crankshaft 20. The angle of rotation of crankshaft 20 is measured by engine 10 to aid in timing of combustion events in engine 10 and for other purposes. The angle of rotation of crankshaft 20 may be measured in a plurality of locations, including a main crank pulley (not shown), an engine flywheel (not shown), an engine camshaft (not shown), or on the camshaft itself. Measurement of crankshaft 20 rotation angle may be made with toothed wheel sensor 62, rotary Hall sensor 64, and by other techniques. A signal representing the angle of rotation of crankshaft 20, also called the crank angle, is transmitted from toothed wheel sensor 62, rotary Hall sensor 64, or other device to control system 18.

Crankshaft 20 drives high-pressure fuel pump 46 and low-pressure fuel pump 50. The action of low-pressure fuel pump 50 pulls fuel from fuel tank 44 and moves the fuel along fuel circuit 42 toward inlet metering valve 52. From inlet metering valve 52, fuel flows downstream along fuel circuit 42 to high-pressure fuel pump 46. High-pressure fuel pump 46 moves the fuel downstream along fuel circuit 42 through outlet check valves 54 toward fuel accumulator or rail 48. Inlet metering valve 52 receives control signals from control system 18 and is operable to block fuel flow to high-pressure fuel pump 46. Inlet metering valve 52 may be a proportional valve or may be an on-off valve that is capable of being rapidly modulated between an open and a closed position to adjust the amount of fluid flowing through the valve.

Fuel pressure sensor 60 is connected with fuel accumulator 48 and is capable of detecting or measuring the fuel pressure in fuel accumulator 48. Fuel pressure sensor 60 sends signals indicative of the fuel pressure in fuel accumulator 48 to control system 18. Fuel accumulator 48 is connected to each fuel injector 38. Control system 18 provides control signals to fuel injectors 38 that determines operating parameters for each fuel injector 38, such as the length of time fuel injectors 38 operate and the distance that an internal plunger (not shown) in each fuel injector 38 opens, which determines the amount of fuel delivered by each fuel injector 38.

Figure 2:
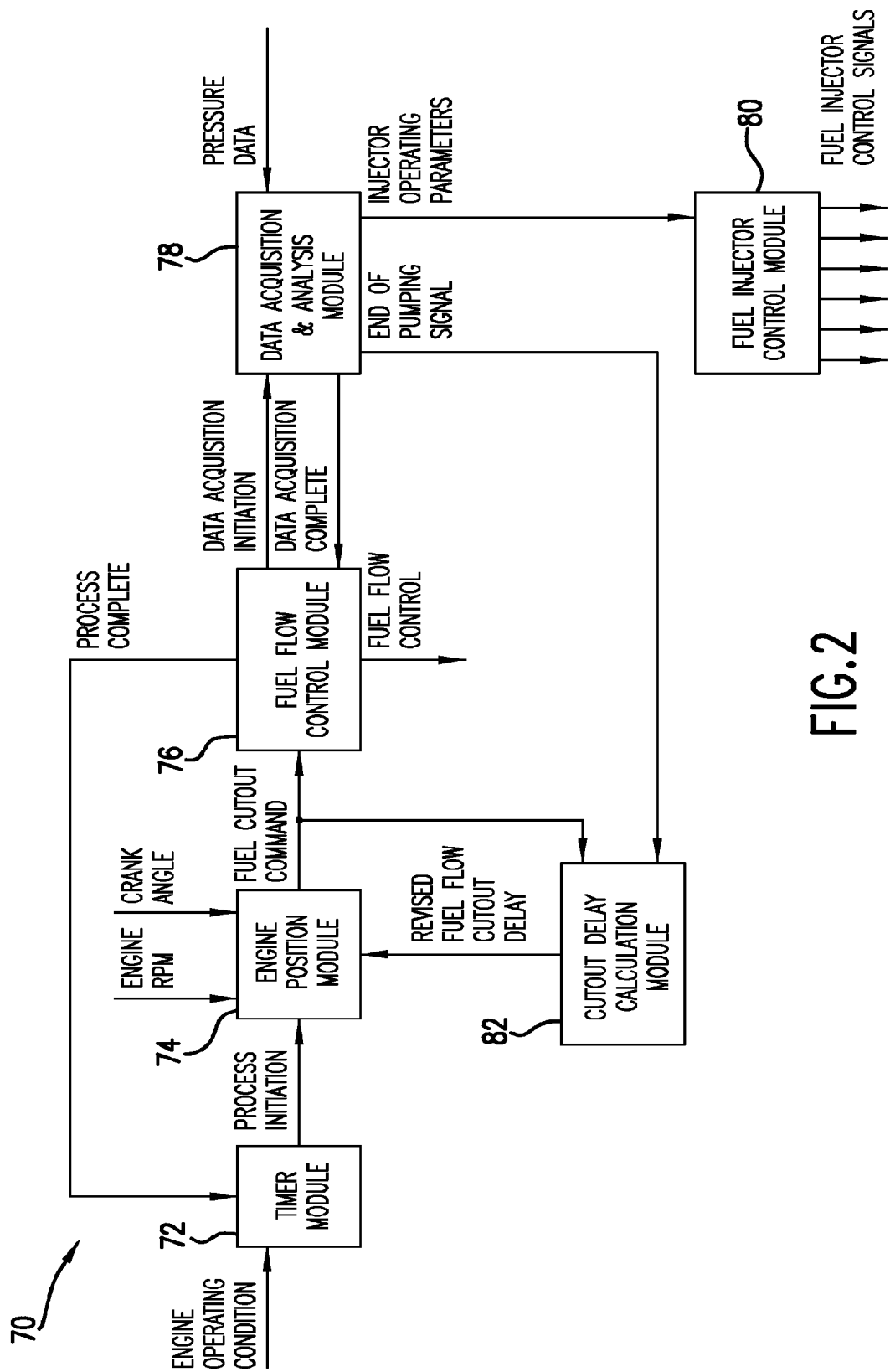
FIG. 2 is a data acquisition, analysis and control (DAC) module of the engine of FIG. 1 in accordance with an exemplary embodiment of the present disclosure.

Control system 18 includes a process that controls certain components of engine 10 to enable measurement of fuel delivery by each individual fuel injector 38, and receives information from certain components of engine 10 to be able to determine a fuel flow cutout command lead angle or delay to optimize the acquisition of data from fuel pressure sensor 60. Turning now to FIG. 2, a data acquisition, analysis and control (DAC) module 70 in accordance with an exemplary embodiment of the present disclosure is shown. DAC module 70 includes a timer module 72, an engine position module 74, a fuel flow control module 76, a data acquisition and analysis module 78, a fuel injector control module 80, and a cutout delay calculation module 82.

Timer module 72 receives a signal indicative of an operating condition of engine 10 and a process complete signal from fuel flow control module 76. The function of timer module 72 is to initiate the data acquisition process of DAC module 70 when the operating condition of engine 10 permits and at a specific or predetermined interval. In order to initiate the data acquisition process, timer module 72 initiates or starts a timing process using either the operating condition of engine 10 or the completion of a previous data acquisition process. When engine 10 initially starts, timer module 72 receives the engine operating condition signal from control system 18 that indicates engine 10 is operating, which initiates a timer in timer module 72. When the timer reaches a specified or predetermined interval, timer module 72 generates and transmits a process initiation signal to engine position module 74. Subsequent timing processes are initiated from the process complete signal received from flow control module 76.

The engine operating condition signal may be a signal from control system 18 indicating that engine 10 is operating, meaning that high-pressure fuel pump 46 and fuel injectors 38 are operating. The engine operating condition signal may indicate that engine 10 is not operating properly. For example, engine 10 may have a fuel system malfunction that would cause fuel pressure sensor 60 to have erroneous readings. In another example, engine 10 may need to be within a certain performance range for DAC module 70 to operate correctly. In yet another example, engine 10 may be in a shutdown mode or may already have ceased operation. In any of these examples, pressure data from fuel pressure sensor 60 may be misleading, and DAC module 70 would either not operate or would stop operating on receipt of an engine operating signal indicative of engine 10 operation that would cause erroneous pressure signals from fuel pressure sensor 60.

Engine position module 74 receives the process initiation signal from timer module 72, engine RPM data and crank angle data from internal combustion engine 10, and a fuel flow cutout delay signal from cutout delay calculation module 82. Engine position module 74 generates and transmits a fuel cutout command to fuel flow control module 76 and to cutout delay calculation module 82. Though not specifically shown in FIG. 2, engine position module 74 provides crank angle data to at least data acquisition and analysis module 78 and cutout delay calculation module 82 for use in analyzing the pressure signals and performing other calculations. After engine position module 74 receives the process initiation signal from timer module 72, engine position module 74 uses the engine RPM and crank angle data in combination with an estimated or calculated fuel cutout delay to determine the optimal crank angle or time for initiation of the fuel cutout command. The optimal crank angle or time for initiation of the fuel cutout command is in advance of a predetermined crank angle associated with start of data acquisition for a fuel injection event associated with a specific fuel injector. When the optimal crank angle is detected, engine position module 74 transmits the fuel cutout command to flow control module 76 and to cutout delay calculation module 82.

Fuel flow control module 76 receives the fuel cutout command from engine position module 74, and a data acquisition complete signal from data acquisition and analysis module 78. Flow control module 76 generates and transmits a data acquisition initiation signal to data acquisition and analysis module 78, the process complete signal to timer module 72 and a fuel flow control signal to fuel system 16. After flow control module 76 receives the fuel cutout command, flow control module 76 transmits the fuel flow control signal to fuel system 16 to stop fuel flow to fuel accumulator 48. The transmission of the fuel flow control signal occurs at a first crank angle. Flow control module 76 then transmits the data acquisition initiation signal to data acquisition and analysis module 78. After flow control module 76 receives the data acquisition complete signal from data acquisition and analysis module 78, flow control module 76 sends the fuel flow control signal to fuel system 16 to re-start fuel flow to fuel accumulator 48. Once fuel flow has been re-started, fuel flow control module 76 sends the process complete signal to timer module 72, which will cause the timing process to begin again to set another interval for data acquisition.

Data acquisition and analysis module 78 receives the data acquisition initiation signal from flow control module 76 and a fuel pressure data signal from fuel rail or accumulator pressure sensor 60. Module 78 generates and provides one or more injector operating parameter signals to fuel injector control module 80, the data acquisition complete signal to flow control module 76, and an end of pumping signal to cutout delay calculation module 82. When data acquisition and analysis module 78 receives the data acquisition initiation signal from flow control module 76, data acquisition and analysis module 78 begins to store fuel pressure data signals from accumulator pressure sensor 60. Module 78 will analyze the fuel pressure data signals to determine when fuel accumulator 48 has stopped receiving fuel flow from fuel system 16. When data acquisition and analysis module 78 determines that fuel is no longer flowing into fuel accumulator 48 from fuel system 16, module 78 sends an end of pumping or end of fuel flow signal to cutout delay calculation module 82. Data acquisition and analysis module 78 may also transmit crank angle data with the end of pumping or end of fuel flow signal. Data acquisition and analysis module 78 also analyzes the fuel pressure data signals to determine when a predetermined decrease in the fuel pressure, which may also be described as a predetermined pressure differential, has been reached. Once the predetermined fuel pressure decrease has been reached, module 78 will complete the analysis of the fuel pressure data signals to determine whether the operating parameters for one or more fuel injectors 38 needs to be modified. If one or more operating parameters for any fuel injector 38 require adjustment, module 78 will transmit the modified fuel injector operating parameters to fuel injector control module 80 for use in subsequent fuel injection events. Once the predetermined fuel pressure decrease has been reached, data acquisition and analysis module 78 also generates and transmits the data acquisition complete signal to flow control module 76.

Fuel injector control module 80 receives fuel injector operating parameters from data acquisition and analysis module 78 and provides signals to each fuel injector 38 that control the operation of each fuel injector 38. For example, the operating parameters may include the duration of the injection event, which may be described as an injection event on-time or the time of operation for each fuel injector 38, and may include a stroke length of a nozzle valve element (not shown) for each fuel injector 38.

Cutout delay calculation module 82 receives the fuel cutout command and crank angle data from engine position module 74 and the end of pumping signal from data acquisition and analysis module 78 along with crank angle data from engine position module 74. Cutout delay calculation module 82 uses these signals and data to determine the fuel flow cutout command delay that occurs between the transmission of a signal to fuel system 16 to stop fuel flow, which occurs at the first crank angle, and the actual cessation of fuel flow into fuel accumulator 48, which occurs at a second crank angle. Cutout delay calculation module 82 generates and transmits the fuel flow command cutout delay signal, which may be revised from the previously used fuel flow cutout command delay, to engine position module 74. Engine position module 74 uses the cutout delay signal to determine how far in advance the fuel command cutout command delay needs transmitted to assure optimal matching of a data acquisition window with the actual stop of fuel flow.

Figure 3:
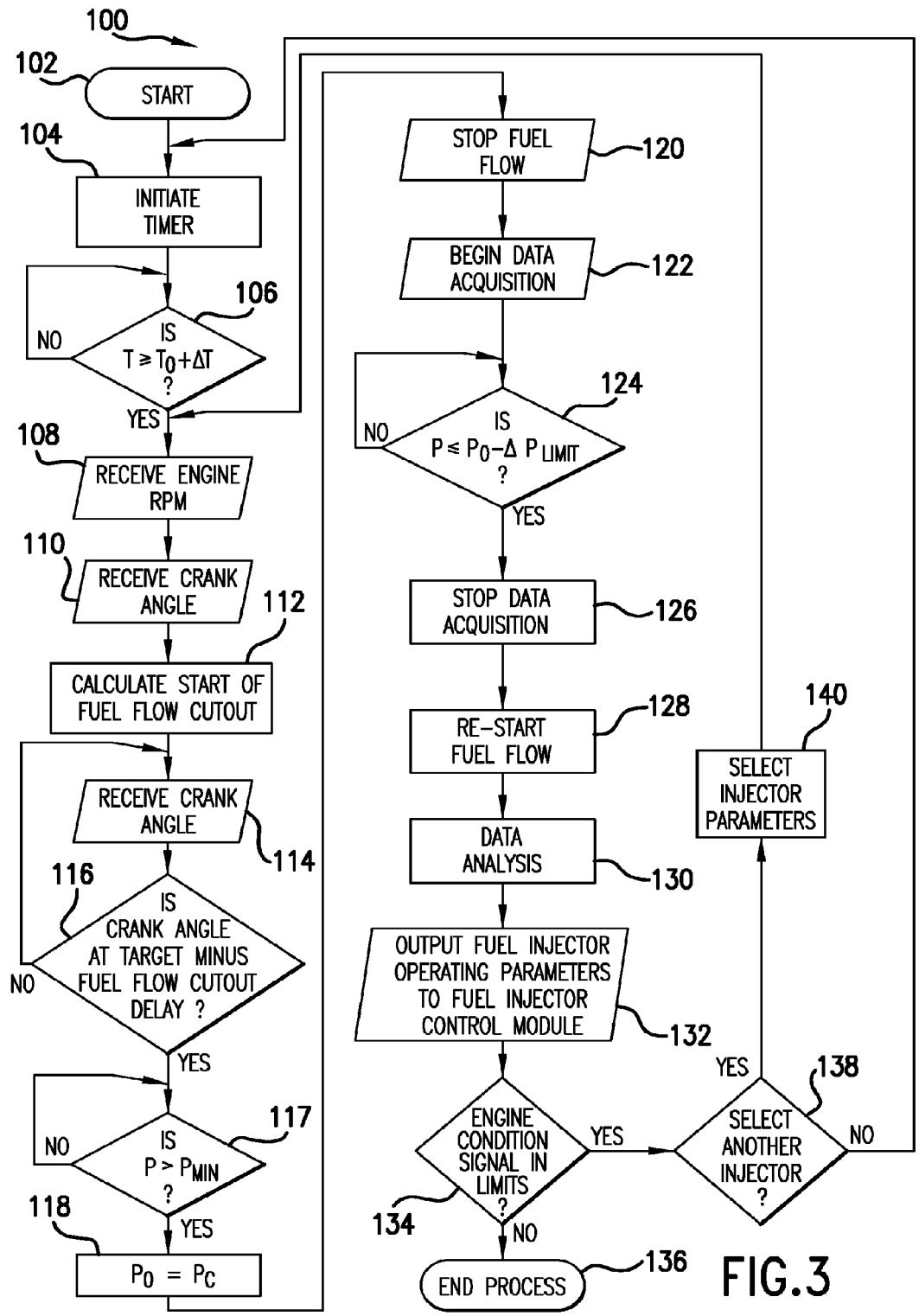
FIG. 3 is a process flow diagram for a data acquisition process of the DAC module of FIG. 2 in accordance with an exemplary embodiment of the present disclosure.

Turning now to FIG. 3, a flow diagram describing a data acquisition process 100 of control system 18 in accordance with an exemplary embodiment of the present disclosure is shown. Data acquisition process 100 may be distributed in one or more modules of control system 18, such as timer module 72, engine position module 74, flow control module 76, data acquisition and analysis module 78, and cutout delay calculation module 82. Data acquisition process 100 is likely to be part of a larger process incorporated in control module 56 that controls some or all of the functions of engine 10. Thus, while FIG. 3 shows data acquisition process 100 as a self-contained process, it is likely that data acquisition process 100 is "called" by a larger process, and at the completion of data acquisition process 100 control is handed back to the calling process.

Data acquisition process 100 initiates with a process 102. Process 102 may include setting variables within data acquisition process 100 to an initial value, clearing registers, and other functions necessary for the proper functioning of data acquisition process 100. From process 102, control passes to a process 104. At process 104, a timer is initiated and a time $T_0$ is set. Data acquisition process 100 may use another timing function of engine 10 to establish an initial time $T_0$ for the requirements of data acquisition process 100. For convenience of explanation, the timing function is described as part of data acquisition process 100.

Data acquisition process 100 continues with a decision process 106. At process 106, data acquisition process 100 determines whether the current time T is greater than or equal to $T_0$ plus a predetermined or specific change in time $\Delta T$ since the timer initiated. In an exemplary embodiment of the disclosure, $\Delta T$ may be 15 minutes. The period may be greater or less than 15 minutes, depending on measured changes in fuel delivered to each combustion chamber or on other conditions. While $\Delta T$ is described in this disclosure as a fixed or predetermined value, $\Delta T$ may be varied based on actual data. For example, if no adjustments to fuel injector 38 parameters are required for a lengthy period, such as one hour or more, $\Delta T$ may be incremented to a higher value, such as 30 minutes, by the action of one of the modules described herein. If T is less than $T_0$ plus $\Delta T$, data acquisition process 100 waits at decision process 106 until the present time is greater than or equal to $T_0$ plus $\Delta T$. As with initial time $T_0$, this timing function may be performed elsewhere in engine 10 and is included in this process for convenience of explanation. Once the condition of decision process 106 has been met, process 100 moves to a process 108.

At process 108, data acquisition process 100 receives engine RPM from internal combustion engine 10. RPM data may be acquired from the crank angle sensor previously described, or from other sensors (not shown) positioned on engine 10. These sensors may be connected directly or indirectly to control system 18. From process 108, data acquisition process 100 move to a process 110, where data acquisition process 100 receives crank angle data from engine 10.

Data acquisition process 100 next moves to a process 112, where the engine RPM received during process 108 and the crank angle information received during process 110 are used in conjunction with a fuel flow cutout command lead angle or fuel flow cutout command delay time to determine an optimal time to initiate the fuel flow cutout command. One challenge with stopping fuel flow to fuel accumulator 48 is that it takes a finite amount of time for a fuel flow cutout command to be transmitted from control system 18 to fuel system 16, and for fuel system 16 to respond to the command. Even after fuel system 16 stops fuel flow, if fuel flow is stopped by preventing fuel flow from reaching high-pressure pump 46, there may yet remain fuel in high-pressure pump 46, which will pump the residual fuel to accumulator 48. Thus, the function of process 112 is to determine, based on the fuel flow cutout command delay measured from pressure data, engine RPM, and crank angle, the optimal crank angle to send the fuel flow cutout command to fuel system 16 to maximize acquisition of valid data during fuel injection events. The timing of the fuel flow cutout command is important because fuel flow needs maintained and the window for data collection is relatively narrow. If the fuel flow cutout command is transmitted at a non-optimal crank angle, it is possible that no pressure data will be collected during a fuel flow cutout event or a termination event.

From process 112, data acquisition process 100 moves to a process 114, where the current crank angle position is received by data acquisition process 100. At a decision process 116, data acquisition process 100 determines when the crank angle that is optimum for stopping fuel flow to fuel accumulator 48 has been reached. If the optimum crank angle has yet to be reached, control will return to process 114. Decision process 116 and process 114 will be repeated until the optimum crank angle has been achieved. When the optimum crank angle has been reached, control passes to a process 117, where data acquisition process 100 determines whether the pressure P in fuel accumulator 48 is greater than $P_{Min}$, which is a typical or normal operating pressure for fuel accumulator 48. The intent of process 117 is to assure that fuel accumulator 48 is at the normal operating pressure. If the pressure P does not meet the condition of process 117, data acquisition process 100 waits until the condition of process 117 is met. Data acquisition process 100 then moves to a process 118, where data acquisition process 100 sets fuel pressure $P_0$ to the current fuel pressure $P_C$ in fuel accumulator 48.

Data acquisition process 100 then moves to a process 120. In the exemplary embodiment, at process 120 control system 18 generates and transmits a control signal to inlet metering valve 52 to close, stopping fuel flow to high-pressure fuel pump 46, forming the start of a termination event. In other embodiments, fuel flow may be stopped in other ways. For example, the fuel pump may be connected to the engine by a clutch or may be electrically driven, and the control signal may disengage the clutch or stop operation of the fuel pump. In yet another embodiment, a valve arrangement may bypass fuel from the fuel pump back to the fuel tank. In a further embodiment, a valve may be positioned to connect the inlet of high-pressure fuel pump 46 with a pumping chamber (not shown) of high-pressure fuel pump 46, preventing pressurization of the pumping chamber to a sufficiently high level to open outlet check valves 54. Control system 18 begins storing fuel pressure signals from accumulator pressure sensor 60 at a process 122. In order to minimize computing resources, the data from accumulator pressure sensor 60 is stored in a plurality of pre-injection pressure (PIP) buffers, described hereinbelow.

Data acquisition will proceed from the first piston selected by data acquisition process 100 through the firing sequence. Data acquisition may begin considering piston firing order, or to acquire data for a piston for which data is lacking. For example, data acquisition may begin with piston #1 and proceed through the firing sequence, which may be piston 22, piston 30, piston 26, piston 32, piston 24, and piston 28, or piston #1, piston #5, piston #3, piston #6, piston #2, and piston #4. However, data acquisition may begin with any piston.

At a decision process 124, data acquisition process 100 determines whether the fuel pressure in fuel accumulator 48 is less than or equal to $P_0$ minus $\Delta P_{Limit}$, where $\Delta P_{Limit}$ is the maximum total fuel pressure decrease or pressure differential permissible in fuel accumulator 48. The quantity $\Delta P_{Limit}$ is a predetermined value that maintains a typical or normal operating pressure in fuel accumulator 48 during the shutdown of fuel flow to fuel accumulator 48. Once the condition of decision process 124 has been met, data acquisition process 100 moves to a process 126, where data acquisition from accumulator pressure sensor 60 is stopped.

At a process 128, control system 18 generates and transmits a signal to inlet metering valve 52 to open, restore, enable, re-enable, start, or re-start fuel flow to high-pressure fuel pump 46 and fuel accumulator 48, ending the termination event. The fuel pressure signals or data acquired during the data acquisition process are analyzed by control system 18 at a process 130. Included in data analysis process 130 is a determination of when fuel flow to fuel accumulator 48 stopped and the amount of fuel delivered during each fuel injection event that took place during the data acquisition process. Data analysis process 130 may also determine the crank angle and/or the time interval that passed from when the control signal was sent to stop fuel flow until fuel flow actually ceased. This calculation is the actual fuel flow cutout delay, which may be averaged with previously calculated fuel flow cutout delays to refine the accuracy of the fuel flow cutout delay. Data analysis process 130 also determines whether one or more operating parameters of one or more fuel injectors 38 require adjustment. If one or more operating parameters of one or more fuel injectors 38 require adjustment, then the parameters are generated and transmitted to fuel injector control module 80 at a process 132.

At a decision process 134, data acquisition process 100 determines whether the engine condition signal indicates engine 10 is operating acceptably and is continuing to operate, as described hereinabove. If the engine condition signal indicates engine 10 is operating in a manner that would lead to erroneous pressure data from fuel pressure sensor 60, or that engine 10 is shutting down or has shut down, then measurement of fuel delivery by fuel injectors 38 is no longer desirable and may lead to invalid data. In these situations, data acquisition process 100 ends at a process 136. If engine 10 is continuing to operate, and to operate in a manner that would yield accurate fuel pressure data from fuel pressure sensor 60, data acquisition process 100 moves to a decision process 138, where data acquisition process 100 determines whether data for another fuel injector 38 needs to be acquired. If data for another fuel injector 38 needs acquired, data acquisition process 100 moves to a process 140.

At process 140, parameters for data acquisition centered on another fuel injector are set. For example, if data needs collected for piston #6, which is piston 32, a fuel cutout delay for piston #6 is set, after which data acquisition process 100 returns to process 108 where additional data is collected. Data acquisition process 100 will continue to return to process 108 until at least one set of data is collected for each fuel injector 38, after which data acquisition process 100 returns to process 104, where the timer is restarted and data acquisition process 100 continues as previously described.

While data acquisition process 100 is described in the context of six pistons, data acquisition process 100 may be used for any number of pistons. The only adjustment required for the process to function properly is to provide the crank angles for firing of the pistons, and the firing order.

Figure 4:
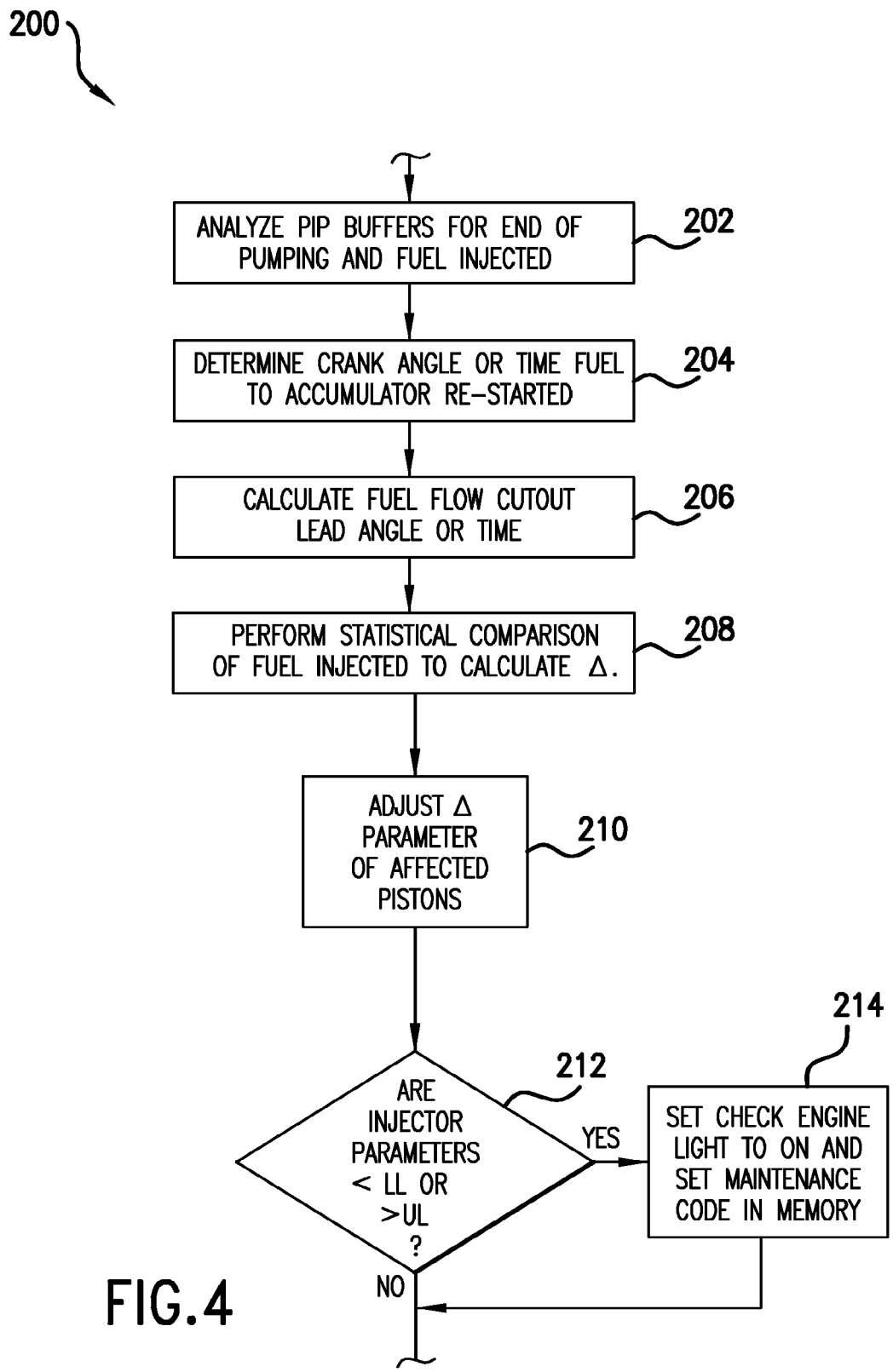
FIG. 4 is a process flow diagram for a data analysis process of FIG. 3 in accordance with an exemplary embodiment of the present disclosure.

A data analysis process 200 shown in FIG. 4 is a representative data analysis process performed in process 130 of data acquisition process 100. In a process 202, data analysis process 200 analyzes the PIP buffers to determine the crank angle or time of the last fuel flow to fuel accumulator 48 and the amount of fuel injected. In a process 204, the crank angle or time fuel flow to accumulator 48 re-started is determined from the PIP buffer data. At a process 206, using the first crank angle or the time at which the fuel flow cutoff command was sent to fuel system 16 and the second crank angle or the time of last fuel flow to accumulator 48, the fuel flow cutoff command delay, lead angle or time is determined and associated with a particular piston.

Note that while the focus of this discussion is on piston numbers, which equate to PIP buffers described further hereinbelow, for data collection, organization and analysis, organization could also be by fuel injectors, combustion chambers, etc., as long as the firing order is clearly defined and associated with crank angle. Also, note that the fuel pressure decrease data is used to calculate the quantity of fuel delivered by a fuel injector in a known manner. In any set of fuel pressure decrease data acquired, there may be no data for a particular piston, and there may be multiple sets of data from a particular piston, which will be explained in more detail hereinbelow. Data analysis process 200 may perform additional processes with fuel pressure decrease data, such as averaging all available data for a piston over a plurality of predetermined intervals, such as data collected over the last hour, or a longer period. Such averaging might be performed to reduce noise that occurs in such data.

The current and/or recently collected data for each fuel injector 38 or associated piston is compared with historical data for that fuel injector at a process 208 to determine any difference with current and/or recently collected data. From process 208, data analysis process 200 moves to a process 210, where control parameters for each fuel injector 38 associated with the one or more pistons for which data was collected and analyzed are adjusted for future injection events. Such control parameters may include an injector on-time, number of firing pulses, and/or placement of a fuel injection event with respect to the crank angle.

From process 210, data analysis process 200 moves to a decision process 212. At decision process 212, data analysis process 200 compares the parameters of each fuel injector, which may include a fueling characteristic, with predetermined upper limits (UL) and lower limits (LL), which thus forms a range of operation for each fuel injector 38. The fueling characteristic may be defined as a quantity of fuel delivered versus an actuation duration. The fueling characteristic may take the form of one or more equations and/or an adaptive look-up table. If any parameter of any fuel injector 38 falls outside the predetermined limits or range, which may include a trim limit, data analysis process 200 moves to a process 214.

At process 214, data analysis process 200 may set an operator indicator, such as a "CHECK ENGINE," "SERVICE ENGINE SOON," or other indicator visible to an operator of engine 10. Data analysis process 200 may also set a maintenance code in a memory of control system 18, indicating that a particular fuel injector's operating parameters have exceeded a predetermined range. After decision process 212 or after process 214, the data analysis process performed in process 130 of data acquisition process 100 is complete, and the associated processes continue as previously described.

Figure 5:
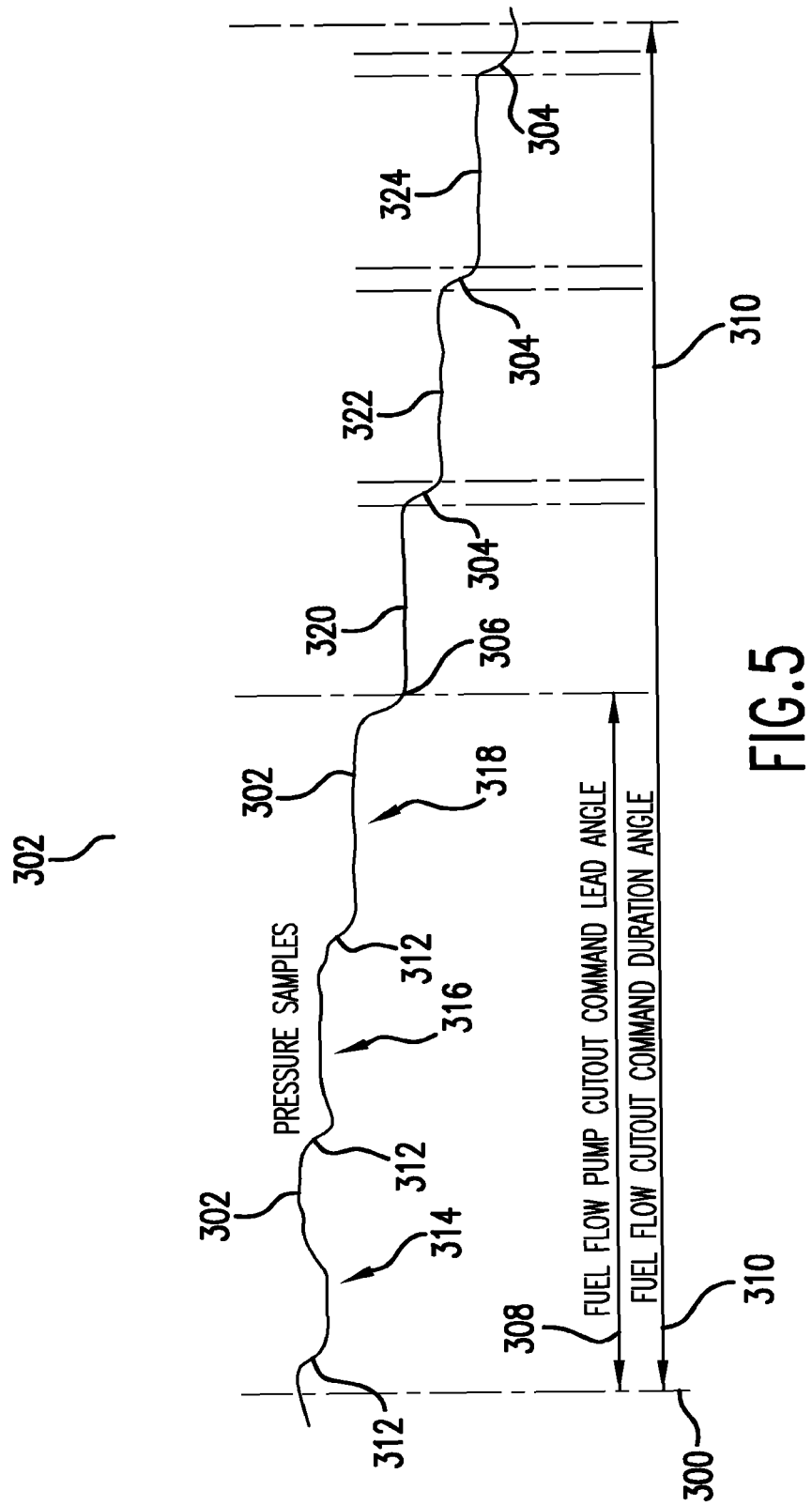
FIG. 5 is a graph showing data acquired from a fuel pressure sensor associated with a fuel accumulator of the internal combustion engine during a fuel flow cutout command to a fuel system of the internal combustion engine of FIG. 1.

FIG. 5 shows representative data acquired during the operation of the previously described processes. The horizontal axis of FIG. 5 shows the crank angle of engine 10, which spans the duration of one fuel flow termination event or the duration of a fuel flow cutout command, shown at a location 310. The vertical axis shows relative fuel pressures of fuel accumulator 48. The fuel flow cutout command is initiated at a location 300. As described hereinabove, fuel may continue to flow to accumulator 48 after the fuel flow cutout command has been transmitted, which leads to irregular or non-uniform fuel pressure signals, shown at a location 302. These pressure signals appear as shown because one or more fuel injectors 38 continue to inject fuel into respective combustion chambers 40 while fuel from fuel system 16 continues to be pumped into accumulator 48.

Process 202 analyzes the fuel pressure signals across location 302, using one or more techniques to determine whether fuel pumping has ceased. For example, process 202 may find one or more pressure decreases 304 or 312, each of which corresponds to a fuel injection event and may be described as an injection event signal portion, and determines whether the pressure during one or more intermediate pressure signal portions 314, 316, 318, 320, 322, and 324, each of which is positioned between an end of one injection event signal portion 304 or 312 and the beginning of a subsequent injection event signal portion 304 or 312, remains constant or includes increases, which would occur from fuel flow to accumulator 48. To conduct this analysis, process 202 may include a process similar to a process 400 described further hereinbelow. Intermediate pressure signal portions 314, 316, 318, 320, 322, and 324 are saved in Pre-Injection Pressure (PIP) buffers for later analysis, using pressure data between two consecutive cylinder firing events or injection events. Process 202 identifies the appropriate data by using an electrical end of injection (EOI) signal of the last pulse for the current cylinder 36 or fuel injector 38 to an electrical start of injection (SOI) signal for the next cylinder 36 or fuel injector 38 fired. In order to assure the data in each of the PIP buffers will provide adequate data for later analysis, the sampling rate for fuel pressure sensor needs to be much higher than the Nyquist rate. In the exemplary embodiment, the sampling rate is approximately twenty times a natural frequency of fuel system 16, described further hereinbelow.

Process 202 also finds the locations of pressure decreases or injection event signal portions 304 or 312 and determines the behavior of the fuel pressure between injection event signal portions 304 or 312, determining whether the intermediate pressure signal portions between pressure decreases 304 or 312 is consistent with a steady-state condition, indicative of no fuel flow into accumulator 48. There may be other analytical techniques for analyzing fuel flow into accumulator 48 to determine when all fuel flow into accumulator 48 has ceased. Once process 202 has determined the crank angle at which fuel flow into accumulator 48 has ceased by the analysis of fuel accumulator 48 pressure throughout the fuel flow cutout command, process 202 then calculates the crank angle from location 300 to a location 306, which defines a fuel flow cutout command delay angle or time 308. As previously noted, fuel flow cutout command delay angle or time 308 is used to determine when to initiate the fuel flow cutout command so that as much data as possible is acquired after the last fuel flow to fuel accumulator 48, which occurs at location 306.

After high-pressure pump 46 pumps any residual fuel into accumulator 48, fuel flow to accumulator 48 ceases, which occurs at location 306. After fuel flow to accumulator 48 ceases, pressure decreases due to injection events may be seen at one or more injection event signal portions 304. Because fuel flow to accumulator 48 has ceased, these pressure decreases are accurate representations of fuel injected by one or more fuel injectors 38, and the modules and processes described hereinabove use these pressure decreases to calculate the amount of fuel injected by the fuel injectors associated with each pressure decrease. In addition, the modules and processes described hereinabove are able to use location 300, which is established by control system 18, and location 306, calculated from fuel pressure data, to determine the fuel flow cutout command delay or lead angle shown at location 308.

Figure 6:
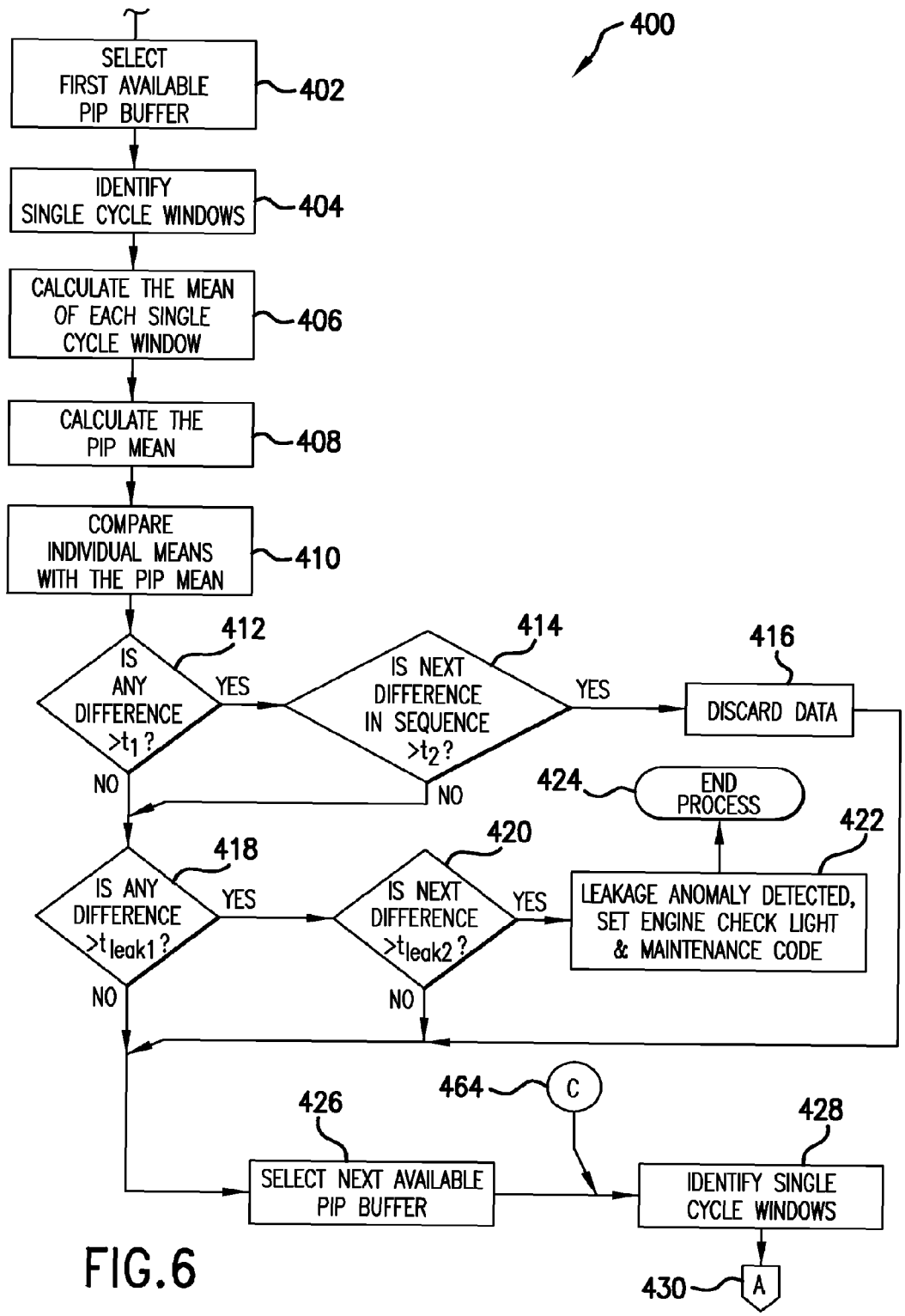
FIG. 6 is a process flow diagram for a calculation and analysis process of FIG. 4 in accordance with an exemplary embodiment of the present disclosure.
Figure 7:
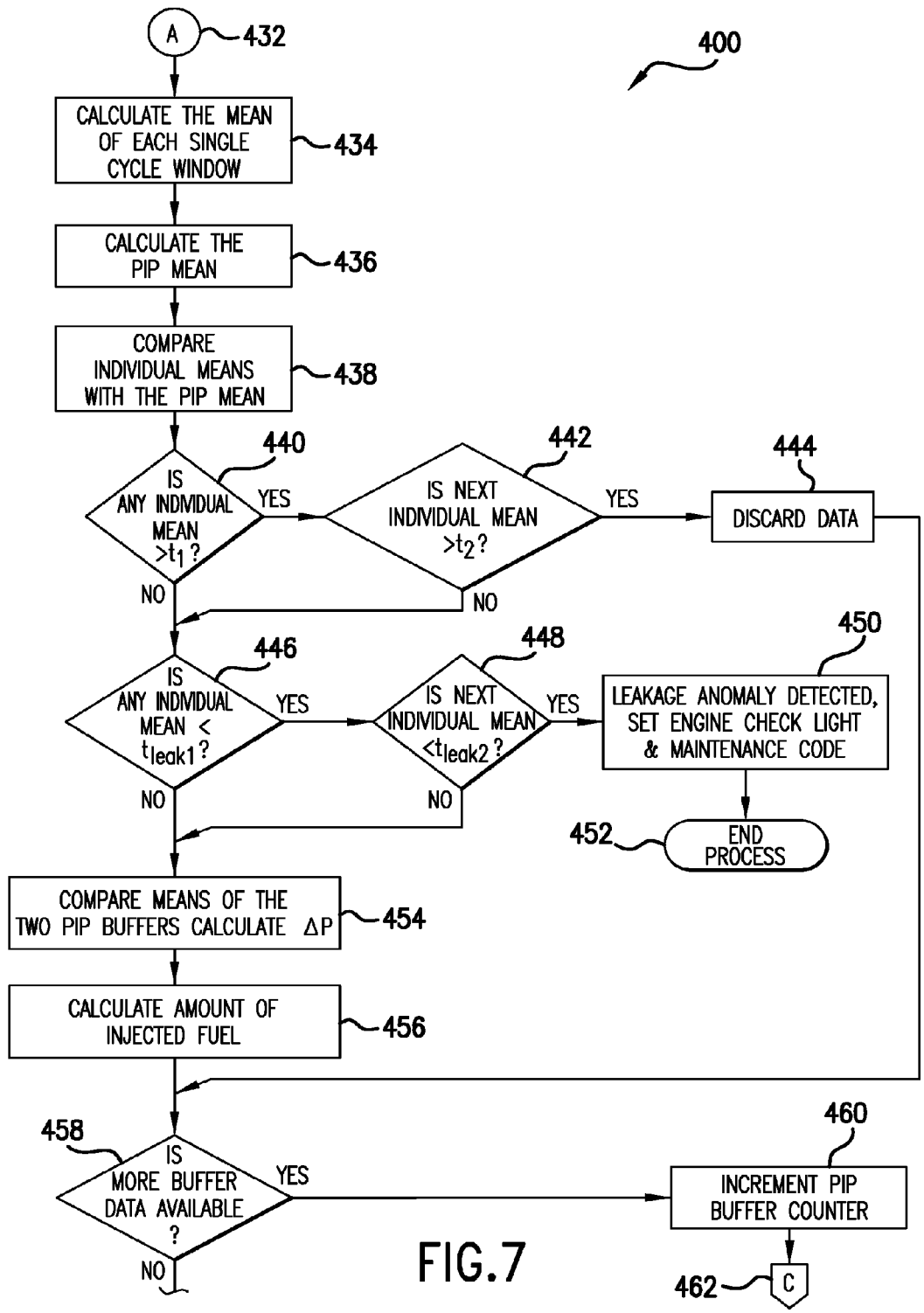
FIG. 7 is continuation of the process flow diagram of FIG. 6.

A calculation and analysis process 400 as shown in FIGS. 6 and 7 is a representative calculation and analysis process performed in process 202 of data analysis process 200. As previously noted, fuel pressure data is stored in a plurality of PIP buffers located in control system 18, with the data from intermediate pressure signal portion 314 stored in a first PIP buffer, graph portion 316 stored in a second PIP buffer, and so on. Calculation and analysis process 400 examines the data in each PIP buffer in sequence.

Process 400 begins by selecting the first available PIP buffer for analysis at a process 402. When data is stored in a PIP buffer, the data is tagged with crank angle data received from the crank angle sensor, so that each PIP buffer represents fuel pressure data prior to injection by a specific fuel injector. This data is sequentially stored and acted upon by process 400.

Figure 8:
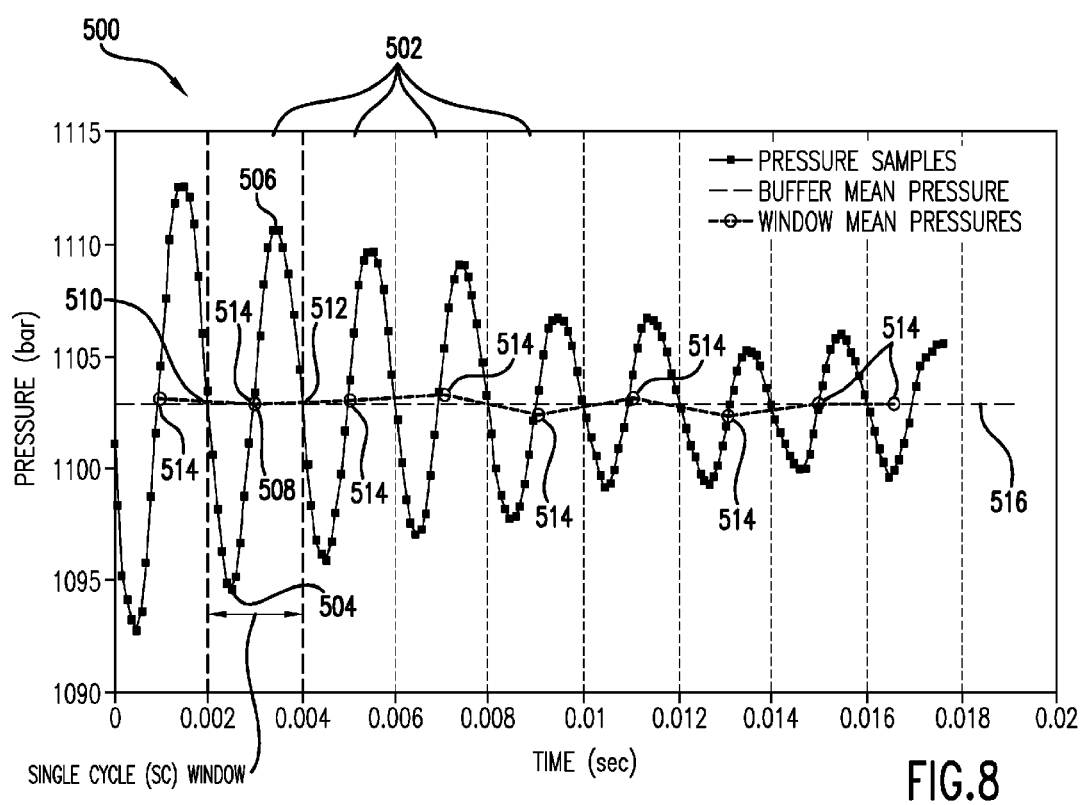
FIG. 8 is a graph showing a representative buffer data curve of the present disclosure.

At a process 404, an integer number of contiguous single cycle windows are identified from the beginning to the end of the selected PIP buffer. Referring to FIG. 8, a graph showing a single representative PIP buffer data curve 500 is presented. The vertical axis of the graph in FIG. 8 represents a range of pressure values extending between 1090 bar and 1115 bar. Thus, FIG. 8 is greatly amplified representation of the selected PIP buffer data. Fuel system 16 has a natural frequency $f_n$, which may be found from equation (1). It should be noted that equation (1) is but one of many equations that may be used to predetermine or predict the system natural frequency $f_n$ based on one or more operating conditions of engine 10.

$$f_n = (C_{1f} * \sqrt{P}) + C_{0f} \quad \text{Equation (1)}$$

In equation (1), $C_{1f}$ and $C_{0f}$ are constants that can be calibrated, and P is the fuel pressure of accumulator 48 at the start of the selected buffer. Once the natural frequency $f_n$ of fuel system 16 at fuel accumulator 48 is calculated, the width of single cycle windows 502, which is equal to one wavelength, may be determined using the known relationship between frequency and wavelength, with velocity being the speed of sound. While each single cycle window 502 is described as being one wavelength in the exemplary embodiment, single cycle windows 502 may be formed by a portion of a wavelength, such as half a wavelength. Regardless of the width of each single cycle window 502, the total width of all single cycle windows 502 is equal to an integer number of wavelengths. While single cycle windows 502 may be set at a fixed width to minimize processing time and complexity, and while the results of using a fixed width have been shown in actual application to provide accurate results, single cycle windows 502 need not be fixed in width. For example, the pressure signal data in a PIP buffer may be analyzed using equation (1) or other equation for finding the natural frequency of fuel system 16, and adjusting the natural frequency for varying pressure in a PIP buffer and other factors that may affect the natural frequency of fuel system 16.

Using an equation such as equation (1) predetermines or predicts the width of single cycle windows 502. The width of single cycle windows 502 may be identified in other ways that include using the PIP buffer data. For example, once PIP buffer data 500 is identified by a combination of crank angle and injection event data, then adjacent peaks 504 and 506 may be identified as local minima and maxima. An approximate midpoint 508 may be calculated from the position of peaks 504 and 506 along the horizontal axis, which may be in terms of time or crank angle. Once midpoint 508 is identified, a position along the vertical pressure axis is also identified by the position of midpoint 508 on the curve of PIP buffer data 500. Now calculation and analysis process 400 is able to find the next adjacent positions along the horizontal axis where the value of PIP buffer data 500 along the vertical axis is the same as at midpoint 508, which is generally indicated at locations 510 and 512. Regardless of the process used to identify the first single cycle window 502, the remainder of the windows may be easily identified by using the width of the first single cycle window 502 to establish adjacent and contiguous single cycle windows 502 along the horizontal axis. Single cycle windows 502 are identified until there is insufficient data to include a complete wavelength in one or more single cycle windows 502. The total width of all single cycle windows 502 is an integer number of full wavelengths.

Because of the need to identify an integer number of single cycle windows 502, using the period of oscillations caused by the natural frequency of fuel system 18, the width of each PIP buffer will be variable. Incomplete cycle data at either the beginning or the end of the buffer is discarded because it will not permit the establishment of single cycle windows 502 having complete wavelengths, which is necessary to have an accurate average.

The next step in process 400 is to calculate a single value pressure that represents the pressure signal in each single cycle window 502. In the exemplary embodiment, the single value pressure is the mean pressure of each single cycle window 502, represented by one or more data points 514 in FIG. 9, which occurs at a process 406. In another embodiment, the single value pressure may represent the median pressure of each single cycle window 502, which may be used for calculation and comparison purposes. In yet another embodiment, the pressure signal in each single cycle window 502 may be manipulated to provide a weighted average, which thus represents the single value pressure. In other embodiments, other mathematical equations may be used to provide a single value pressure to represent the pressure signal within each single cycle window 502. As long as each single cycle window 502 and each PIP buffer 500 is similarly processed, using the same analytical technique, the results may be used in the process described hereinbelow, substituting the term "mean" with the analytical technique used, e.g., median. At least two mean pressures 514 are then averaged across PIP buffer 500 to establish a PIP buffer, intermediate pressure signal portion mean pressure, or intermediate pressure 516 at a process 408. If each single cycle window 502 represents a portion of a wavelength, then the number of means is increased by the portion of a wavelength that each single cycle window 502 represents. For example, if each single cycle window 502 represents a half wavelength, then the number of mean pressures used to calculate the PIP buffer mean is multiplied by two, thus requiring at least four mean pressures 514 to calculate the PIP buffer mean 516. Similarly, if each single cycle window 502 represents one-quarter wavelength, at least eight mean pressures 514 are required to calculate the pip buffer mean 516, and so on. Once the PIP buffer mean 516 is identified, each individual single cycle mean pressure 514 may be compared to PIP buffer mean pressure 516, defining a series of differences between each individual single cycle mean pressure 514 and PIP buffer mean pressure 516.

Figure 9:
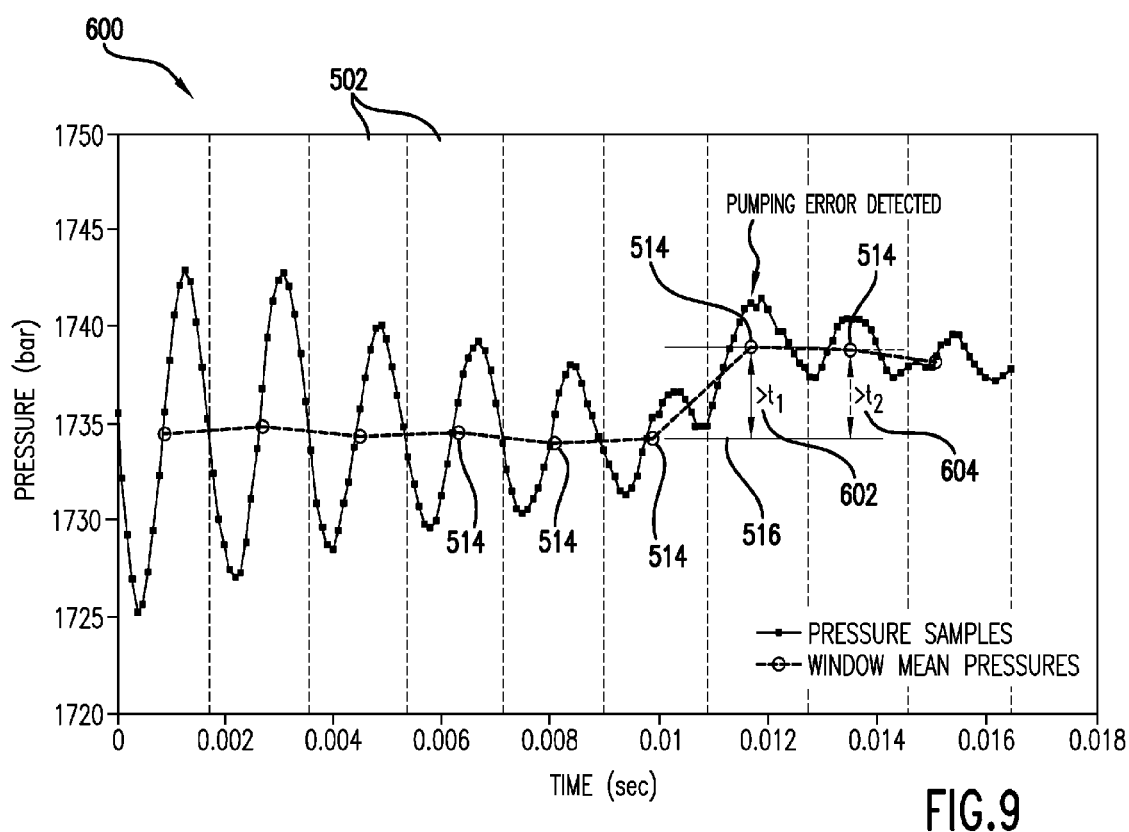
FIG. 9 is a graph showing a representative buffer data curve of the present disclosure that includes a pumping event.

Referring to FIG. 9, calculation and analysis process 400 determines whether a significant increase in mean pressures has occurred during a PIP buffer data curve 600. In the context of this disclosure, the term significant increase is identified or defined as a sustained positive mean shift that is distinguishable from a normal variation in single cycle window mean pressures. A two-stage "detect and confirm" strategy may be employed to identify the significant increase in PIP buffer window mean pressures. At a process 410, each individual single cycle mean pressure 514 is compared with the PIP buffer mean pressure 516 to develop differences between each individual single cycle mean pressure 514 and PIP buffer mean pressure 516. At a decision process 412, the differences are compared with a predetermined threshold $t_1$. If decision process 412 finds any difference is greater than $t_1$, which is a detection step that may be seen graphically in FIG. 9 at location 602 of PIP buffer 600, calculation and analysis process 400 will move to a decision process 414. At decision process 414, the next or neighbor difference in sequence will be compared with a second predetermined threshold $t_2$ that is less than threshold $t_1$, but still sufficiently large enough to be considered a pumping event, shown at 604 in FIG. 9. For example, $t_1$ may be 4.5 bar and $t_2$ may be 4.0 bar. If the next difference in sequence is greater than $t_2$, then the significant shift or increase in the single cycle mean pressures is confirmed. This two-stage approach makes the detection scheme more robust against the normal variation in single cycle window mean pressures, which may arise for one or more reasons, including any frequency mismatch between the calculated natural frequency and the actual dominant frequency. While this two-stage approach makes the system more robust to handle natural frequency variations, the two-stage approach maintains good sensitivity to identify true, sustained variations in mean pressure that would be indicative of a pumping event.

If a pumping event or error is confirmed, calculation and analysis process 400 moves to a process 416, where the data from PIP buffer 600 is discarded because of the detected pumping event or error, which renders the data suspect and valueless without additional processing. Process 400 will then move to a process 426, described further hereinbelow.

Figure 10:
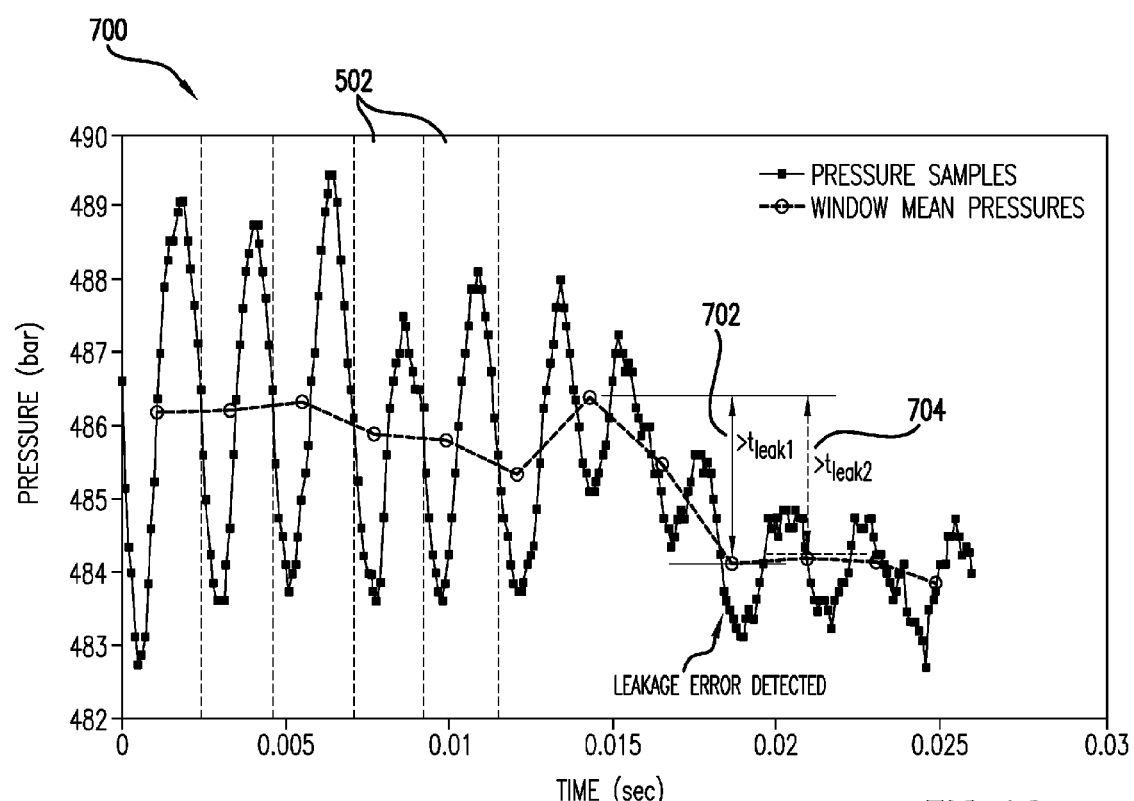
FIG. 10 is a graph showing a representative buffer data curve of the present disclosure that includes an anomalous leakage event.

Returning to decision process 412, if no differences greater than $t_1$ exist, calculation and analysis process 400 moves to a decision process 418. Similarly, at decision process 414, if the next difference in sequence is not greater than $t_2$, then process 400 moves to decision process 418. Calculation and analysis process 400 at decision process 418 determines whether a significant decrease in mean pressures has occurred during a PIP buffer data curve 700. In the context of this disclosure, the term significant decrease is identified or defined as a sustained negative mean pressure shift that is distinguishable from the normal variation in single cycle window mean pressures. As with pumping events, a two-stage "detect and confirm" strategy may be employed to identify the significant decrease in PIP buffer window mean pressures. At decision on process 418, the differences are compared with a predetermined threshold $t_{leak1}$. If decision process 418 finds any difference is greater than $t_{leak1}$, which is a detection step that may be seen graphically in FIG. 10 at location 702 of PIP buffer data curve 700, calculation and analysis process 400 will move to a decision process 420. At decision process 420, the next or neighbor difference in sequence will be compared with a second predetermined threshold $t_{leak2}$ that is less than threshold $t_{leak1}$, but still sufficiently large enough to be considered a leakage event, shown at 704. For example, $t_{leak1}$ may be 2.5 bar and $t_{leak2}$ may be 2.25 bar. If the next difference in sequence is greater than $t_{leak2}$, then the significant shift or decrease in the single cycle mean pressures is confirmed. This two-stage approach makes the detection scheme more robust against the normal variation in single cycle window mean pressures, which may arise for one or more reasons, including any frequency mismatch between the calculated natural frequency and the actual dominant frequency. While this two-stage approach makes the system more robust to handle natural frequency variations, the two-stage approach maintains good sensitivity to identify true, sustained variations in mean pressure that would be indicative of a leakage event or error.

If a leakage event or error is confirmed, calculation and analysis process 400 moves to a process 422, where process 400 establishes a leakage anomaly has occurred. Process 400 may provide signals to control system 18 to illuminate an engine check light on an operator or end user display (not shown) and may set a maintenance code in a memory of control system 18. Process 400 may then take one of several actions. In FIG. 6, process 400 ends with a process 424 because the leakage anomaly prevents normal operation of engine 10, and measurements are sufficiently distorted that the only available action is to stop the process of adjusting for fueling variations. In other embodiments, process 400 may continue, which may permit identification of leakage errors that are common to all fuel injectors 38. If the leakage error is in a fuel injector or a valve associated with a particular fuel injector 38, process 400 may permit engine 10 to operate properly with all fuel injectors 38 except the fuel injector with the leakage error, which may be beyond any ability to adjust due to the identified leakage error.

Returning to decision process 418, if no differences greater than $t_{leak1}$ exist, calculation and analysis process 400 moves to a process 426. Similarly, at decision process 420, if the next difference in sequence is not greater than $t_{leak2}$, then process 400 moves to process 426. At process 426, process 400 selects the next available PIP buffer. At a process 428, an integer number of single cycle windows are identified from the beginning to the end of the selected PIP buffer, described hereinabove. Process 400 then moves from off-page connector 430 of FIG. 6 to on-page connector 432 of FIG. 7.

The next step in process 400 is to calculate the mean of each single cycle window 502 of the new PIP buffer data curve, which occurs at a process 434, and as previously described. The means of each single cycle window 502 are then averaged across the new PIP buffer data to establish a new PIP buffer mean pressure at a process 436. Once the new PIP buffer mean pressure is identified, each individual single cycle mean pressure may be compared to the new PIP buffer mean pressure, defining a series of differences between each individual single cycle mean pressure and the new PIP buffer mean pressure, as previously described hereinabove.

Calculation and analysis process 400 determines whether a significant increase in mean pressures has occurred during the new PIP buffer data curve, as described hereinabove. At a process 438, each individual single cycle mean pressure is compared with the PIP buffer mean pressure to develop differences between each individual single cycle mean pressure and the PIP buffer mean pressure. At a decision process 440, the differences are compared with a predetermined threshold $t_1$. If decision process 440 finds any difference is greater than $t_1$, which is a detection step similar to that shown graphically in FIG. 9 at location 602 of a PIP buffer 600, calculation and analysis process 400 will move to a decision process 442. At decision process 442, the next or neighbor difference in sequence will be compared with a second predetermined threshold $t_2$ that is less than threshold $t_1$, but still sufficiently large enough to be considered a pumping event, similar to that shown at 604. For example, $t_1$ may be 4.5 bar and $t_2$ may be 4.0 bar. If the next difference in sequence is greater than $t_2$, then the significant shift or increase in the single cycle mean pressures is confirmed. This two-stage approach makes the detection scheme more robust against the normal variation in single cycle window mean pressures, which may arise for one or more reasons, including any frequency mismatch between the calculated natural frequency and the actual dominant frequency. While this two-stage approach makes the system more robust to handle natural frequency variations, the two-stage approach maintains good sensitivity to identify true, sustained variations in mean pressure that would be indicative of a pumping event.

If a pumping event or error is confirmed, calculation and analysis process 400 moves to a process 444, where the data from the PIP buffer is discarded because of the detected pumping event or error, which renders the data suspect and valueless without additional processing. Process 400 will then move to a process 458, described further hereinbelow.

Returning to decision process 440, if no differences greater than $t_1$ exist, calculation and analysis process 400 moves to a decision process 446. Similarly, at decision process 442, if the next difference in sequence is not greater than $t_2$, then process 400 moves to decision process 446. Calculation and analysis process 400 at decision process 446 determines whether a significant decrease in mean pressures has occurred during a PIP buffer data curve similar to that of PIP buffer data curve 700. In the context of this disclosure, the term significant decrease is identified or defined as a sustained negative mean pressure shift that is distinguishable from the normal variation in single cycle window mean pressures. As with pumping events, a two-stage "detect and confirm" strategy may be employed to identify the significant decrease in PIP buffer window mean pressures. At a decision process 446, the differences are compared with a predetermined threshold $t_{leak1}$. If decision process 446 finds any difference is greater than $t_{leak1}$, which is a detection step that may be similar to that shown in FIG. 10 at location 702 of PIP buffer data curve 700, calculation and analysis process 400 will move to a decision process 448. At decision process 448, the next or neighbor difference in sequence will be compared with a second predetermined threshold $t_{leak2}$ that is less than threshold $t_{leak1}$, but still sufficiently large enough to be considered a leakage event, similar to that shown at 704. For example, $t_{leak1}$ may be 2.5 bar and $t_{leak2}$ may be 2.25 bar. If the next difference in sequence is greater than $t_{leak2}$, then the significant shift or decrease in the single cycle mean pressures is confirmed. This two-stage approach makes the detection scheme more robust against the normal variation in single cycle window mean pressures, which may arise for one or more reasons, including any frequency mismatch between the calculated natural frequency and the actual dominant frequency. While this two-stage approach makes the system more robust to handle natural frequency variations, the two-stage approach maintains good sensitivity to identify true, sustained variations in mean pressure that would be indicative of a leakage event or error.

If a leakage event or error is confirmed, calculation and analysis process 400 moves to a process 450, where process 400 establishes that a leakage anomaly has occurred. Process 400 may provide signals to control system 18 to illuminate an engine check light on an operator or end user display (not shown) and may set a maintenance code in a memory of control system 18. Process 400 may then take one of several actions. In FIG. 7, process 400 ends with a process 452 because the leakage anomaly prevents normal operation of engine 10, and measurements are sufficiently distorted that the only available action is to stop the process of adjusting for fueling variations. In other embodiments, process 400 may continue, which may permit identification of leakage errors that are common to all fuel injectors 38. If the leakage error is in a fuel injector or a valve associated with a particular fuel injector 38, process 400 may permit engine 10 to operate properly with all fuel injectors 38 except the fuel injector with the leakage error, which may be beyond any ability to adjust due to the identified leakage error.

Returning to decision process 446, if no differences greater than $t_{leak1}$ exist, calculation and analysis process 400 moves to a process 454. Similarly, at decision process 448, if the next difference in sequence is not greater than $t_{leak2}$, then process 400 moves to process 454. At process 454, the mean pressure of the first PIP buffer is compared with the mean pressure of the second PIP buffer to find the difference in pressure between the two consecutive PIP buffers. This pressure differential is used at a process 456 to calculate the amount of fuel injected by the fuel injection event between the two consecutive PIP buffers in a known manner.

Calculation and analysis process 400 next moves to a decision process 458, where process 400 determines whether more PIP buffer data is available for analysis. If more PIP buffer data is available, process 400 moves to a process 460. At process 460, the PIP buffer counter is incremented so that the second PIP buffer is now the first PIP buffer. Process 400 then moves to an off-page connector 462, returning via an on-page connector 464 of FIG. 6, which connects to process 428 to permit process 400 to continue as described hereinabove. If no additional PIP buffer data is available, process 400 returns to process 200 shown in FIG. 4, which continues with process 204.

Figure 11:
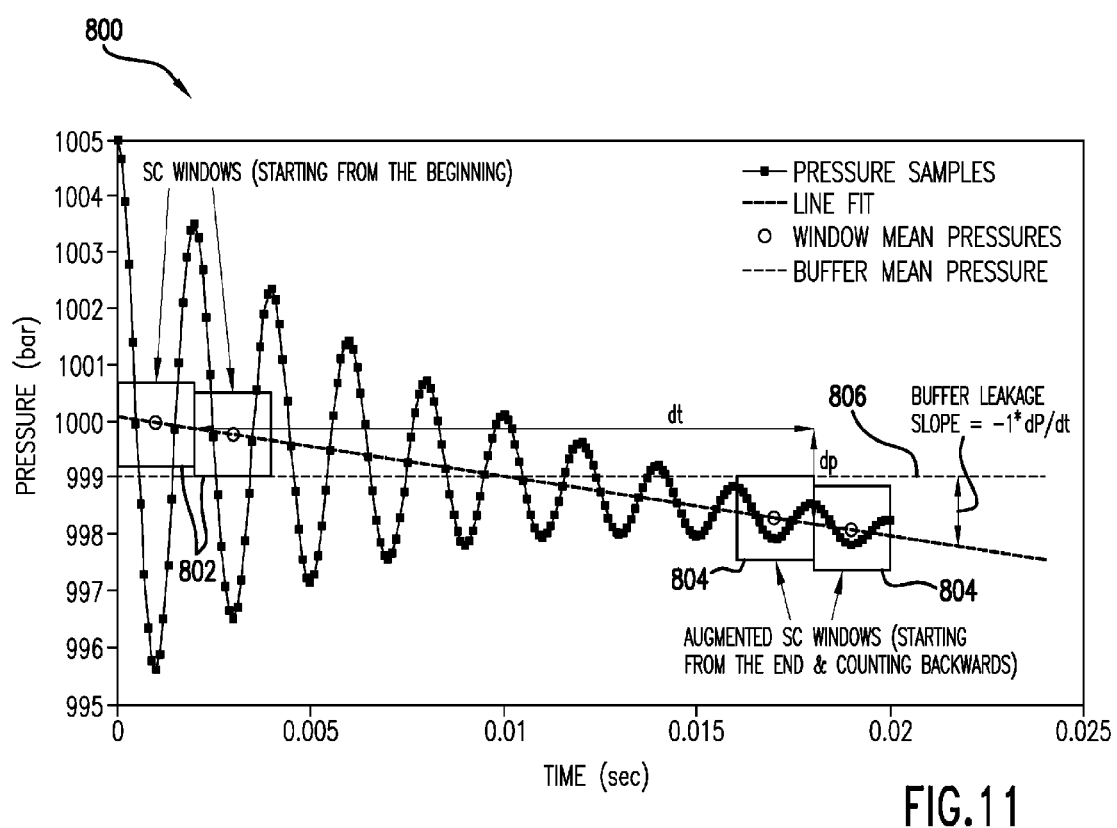
FIG. 11 is a graph showing a representative buffer data curve of the present disclosure for a high leakage fuel system.

Certain fuel systems may be considered high leakage systems, where the pressure decrease in fuel accumulator 48 is sufficiently large enough that the leakage is measurable in the data from one PIP buffer, such as a PIP buffer data curve 800 shown in FIG. 11. The analysis of PIP buffer data curve 800 proceeds similar to the analysis of previously described PIP buffer data curves in that a plurality of single cycle windows are identified. Once the single cycle windows are identified, a first pair of single cycle windows 802 at the beginning of PIP buffer data curve 800 is used to establish a first mean pressure. A second pair of single cycle windows 804 at the end of PIP buffer data curve 800 is used to establish a second mean pressure. These two mean pressures are then used to establish a PIP mean pressure 806 for PIP buffer data curve 800. A similar process is followed with the next PIP buffer in sequence. The two consecutive PIP buffer mean pressures are then fed to a closed loop compensation algorithm (not shown) that is able to learn the behavior of the fuel injectors over time to adjust a fueling to on-time relationship. Such a closed loop compensation configuration can improve accurate fuel delivery in an engine system that leads to reduced variation in engine torque and engine-out emissions, simultaneously compensating for the effect of leakage rate in a high-leakage fuel system. Because PIP buffer data curve 800 has a specific leakage rate, it may be necessary to make adjustments to the values of $t_1$, $t_2$, $t_{leak1}$, and $t_{leak2}$ described hereinabove to detect pumping events and leakage anomalies. As previously noted, these values are calibrated values and the calibration considers the normal operation of an associated fuel system to assure standard operation of the fuel system is not interpreted as a pumping event or a leakage event.

The modules and processes described hereinabove provide the benefits previously described in the context of halting fuel flow to fuel accumulator 48. In certain circumstances, it may be advantageous to acquire and analyze pre-injection pressure while permitting fuel to flow to fuel accumulator 48. Such analysis may be possible under certain circumstances, such as by synchronizing fuel flow or fuel pumping to fuel accumulator 48 in a region of pre-injection pressure that is near the center of the pre-injection pressure.

Turning now to FIG. 11, a flow diagram describing a data acquisition and analysis process 900 of control system 18 in accordance with an exemplary embodiment of the present disclosure is shown. Data acquisition and analysis process 900 may be distributed in one or more modules of a control system similar to control system 18, such as timer module 72, engine position module 74, flow control module 76, data acquisition and analysis module 78, and cutout delay calculation module 82. Data acquisition and analysis process 900 is likely to be part of a larger process incorporated in control module 56 that controls some or all of the functions of engine 10. Thus, while FIG. 11 shows data acquisition and analysis process 900 as a self-contained process, it is likely that data acquisition and analysis process 900 is "called" by a larger process, and at the completion of data acquisition and analysis process 900, control is handed back to the calling process.

Data acquisition and analysis process 900 initiates with a process 902. Process 902 may include setting variables within data acquisition and analysis process 900 to an initial value, clearing registers, and other functions necessary for the proper functioning of data acquisition and analysis process 900. From process 902, control passes to a process 904. At process 904, a timer is initiated and a time $T_0$ is set. Data acquisition and analysis process 100 may use another timing function of engine 10 to establish an initial time $T_0$ for the requirements of data acquisition and analysis process 900. For convenience of explanation, the timing function is described as part of data acquisition and analysis process 900.

Data acquisition and analysis process 900 continues with a decision process 906. At process 906, data acquisition and analysis process 900 determines whether the current time T is greater than or equal to $T_0$ plus a predetermined or specific change in time $\Delta T$ since the timer initiated. In an exemplary embodiment of the disclosure, $\Delta T$ may be 15 minutes. The period may be greater or less than 15 minutes, depending on measured changes in fuel delivered to each combustion chamber or on other conditions. While $\Delta T$ is described in this disclosure as a fixed or predetermined value, $\Delta T$ may be varied based on actual data. For example, if no adjustments to fuel injector 38 parameters are required for a lengthy period, such as one hour or more, $\Delta T$ may be incremented to a higher value, such as 30 minutes, by the action of one of the modules described herein. If T is less than $T_0$ plus $\Delta T$, data acquisition and analysis process 900 waits at decision process 906 until the present time is greater than or equal to $T_0$ plus $\Delta T$. As with initial time $T_0$, this timing function may be performed elsewhere in engine 10 and is included in this process for convenience of explanation. Once the condition of decision process 906 has been met, process 900 moves to a process 908.

At process 908, data acquisition and analysis process 900 receives crank angle data from engine 10. Process 900 then moves to a decision step 910. The function of decision process 910 is to determine when the optimal crank angle has been reached to begin the data acquisition process. In order to maximize useful data, which in this situation begins with pre-injection pressure prior to a target injection, data will be acquired beginning with pre-injection pressure prior to an injection event from a target or desired fuel injector 38, which may be measured using crank angle information. If the target crank angle has yet to be reached, process 900 will loop through process 908 and decision process 910 until the target crank angle is reached.

Once the target crank angle is reached, data acquisition and analysis process 900 moves to a process 912, where data acquisition begins. Control system 18 begins storing fuel pressure signals from accumulator pressure sensor 60 at process 912. In order to minimize computing resources, the data from accumulator pressure sensor 60 is stored in a plurality of pre-injection pressure (PIP) buffers, described hereinbelow. Data acquisition will continue for a period that may be predetermined to provide sufficient data for analysis. Once sufficient data has been acquired, data acquisition and analysis process 900 moves to a process 914, where data acquisition is stopped.

Data acquisition will proceed from the first piston selected by data acquisition and analysis process 900 through the firing sequence. Data acquisition may begin considering piston firing order, or to acquire data for a piston for which data is lacking. For example, data acquisition may begin with piston #1 and proceed through the firing sequence, which may be piston 22, piston 30, piston 26, piston 32, piston 24, and piston 28, or piston #1, piston #5, piston #3, piston #6, piston #2, and piston #4. However, data acquisition may begin with any piston.

The first available PIP buffer is selected for analysis at a process 916. When data is stored in a PIP buffer, the data is tagged with crank angle data received from the crank angle sensor, so that each PIP buffer represents fuel pressure data prior to injection by a specific fuel injector. This data is sequentially stored and acted upon by data acquisition and analysis process 900.

Figure 13:
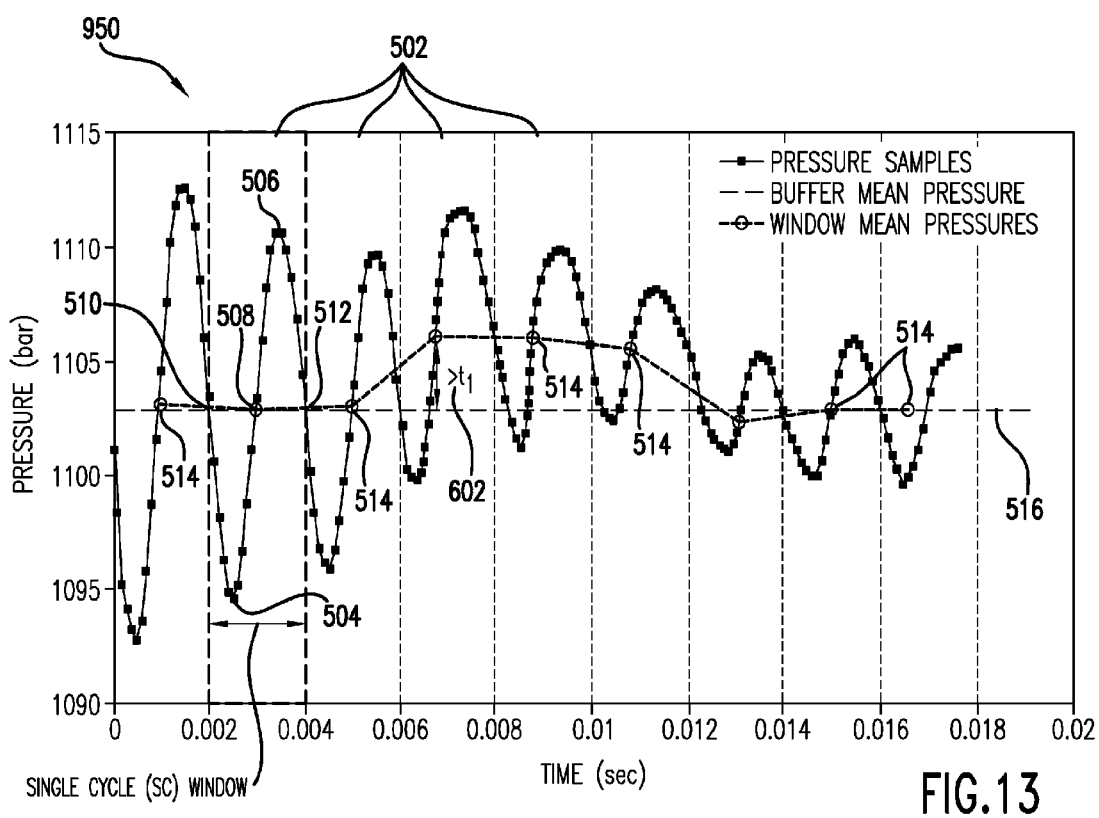
FIG. 13 is a graph showing a representative buffer data curve of the present disclosure.

At a process 918, an integer number of contiguous single cycle windows are identified from the beginning to the end of the selected PIP buffer. Referring to FIG. 13, a graph showing a single representative PIP buffer data curve 950 is presented. The vertical axis of the graph in FIG. 13 represents a range of pressure values extending between 1090 bar and 1115 bar. Thus, FIG. 13 is greatly amplified representation of the selected PIP buffer data. Fuel system 16 has a natural frequency $f_n$, which may be found from equation (1), previously presented and described hereinabove. Once the natural frequency $f_n$ of fuel system 16 at fuel accumulator 48 is calculated, the width of single cycle windows 502, which is equal to one wavelength, may be determined using the known relationship between frequency and wavelength, with velocity being the speed of sound. While each single cycle window 502 is described as being one wavelength in the exemplary embodiment, single cycle windows 502 may be formed by a portion of a wavelength, such as half a wavelength. Regardless of the width of each single cycle window 502, the total width of all single cycle windows 502 is equal to an integer number of wavelengths.

The width of single cycle windows 502 may be identified in other ways. For example, once PIP buffer data 500 is identified by a combination of crank angle and injection event data, then adjacent peaks 504 and 506 may be identified as local minima and maxima. An approximate midpoint 508 may be calculated from the position of peaks 504 and 506 along the horizontal axis, which may be in terms of time or crank angle. Once midpoint 508 is identified, a position along the vertical pressure axis is also identified by the position of midpoint 508 on the curve of PIP buffer data 950. Now data acquisition and analysis process 900 is able to find the next adjacent positions along the horizontal axis where the value of PIP buffer data 500 along the vertical axis is the same as at midpoint 508, which is generally indicated at locations 510 and 512. Regardless of the process used to identify the first single cycle window 502, the remainder of the windows may be easily identified by using the width of the first single cycle window 502 to establish adjacent and contiguous single cycle windows 502 along the horizontal axis. Single cycle windows 502 are identified until there is insufficient data to include a complete wavelength in one or more single cycle windows 502. The total width of all single cycle windows 502 is an integer number of full wavelengths.

Because of the need to identify an integer number of single cycle windows 502, using the period of oscillations caused by the natural frequency of fuel system 18, the width of each PIP buffer will be variable. Incomplete cycle data at either the beginning or the end of the buffer is discarded because it will not permit the establishment of single cycle windows 502 having complete wavelengths, which is necessary to have an accurate average.

In the exemplary embodiment, the next step in data acquisition and analysis process 950 is to calculate the mean pressure of each single cycle window 502, represented by one or more data points 514 in FIG. 13, which occurs at a process 920. In another embodiment, the median pressure of each single cycle window 502 may be used for calculation and comparison purposes. In yet another embodiment, the pressure signal in each single cycle window 502 may be manipulated to provide a weighted average. As long as each single cycle window 502 is similarly processed, using the same analytical technique, the results may be used in the process described hereinbelow, substituting the term "mean" with the analytical technique used, e.g., median. At least two mean pressures 514 are then averaged across PIP buffer 950 to establish a PIP buffer or intermediate pressure signal portion mean pressure 516 at a process 922. If each single cycle window 502 represents a portion of a wavelength, then the number of means is increased by the portion of a wavelength that each single cycle window 502 represents. For example, if each single cycle window 502 represents a half wavelength, then the number of mean pressures used to calculate the PIP buffer mean is multiplied by two, thus requiring at least four mean pressures 514 to calculate the PIP buffer mean 516. Similarly, if each single cycle window 502 represents one-quarter wavelength, at least eight mean pressures 514 are required to calculate the pip buffer mean 516, and so on. Once the PIP buffer mean 516 is identified, each individual single cycle mean pressure 514 may be compared to PIP buffer mean pressure 516, defining a series of differences between each individual single cycle mean pressure 514 and PIP buffer mean pressure 516.

Figure 12:
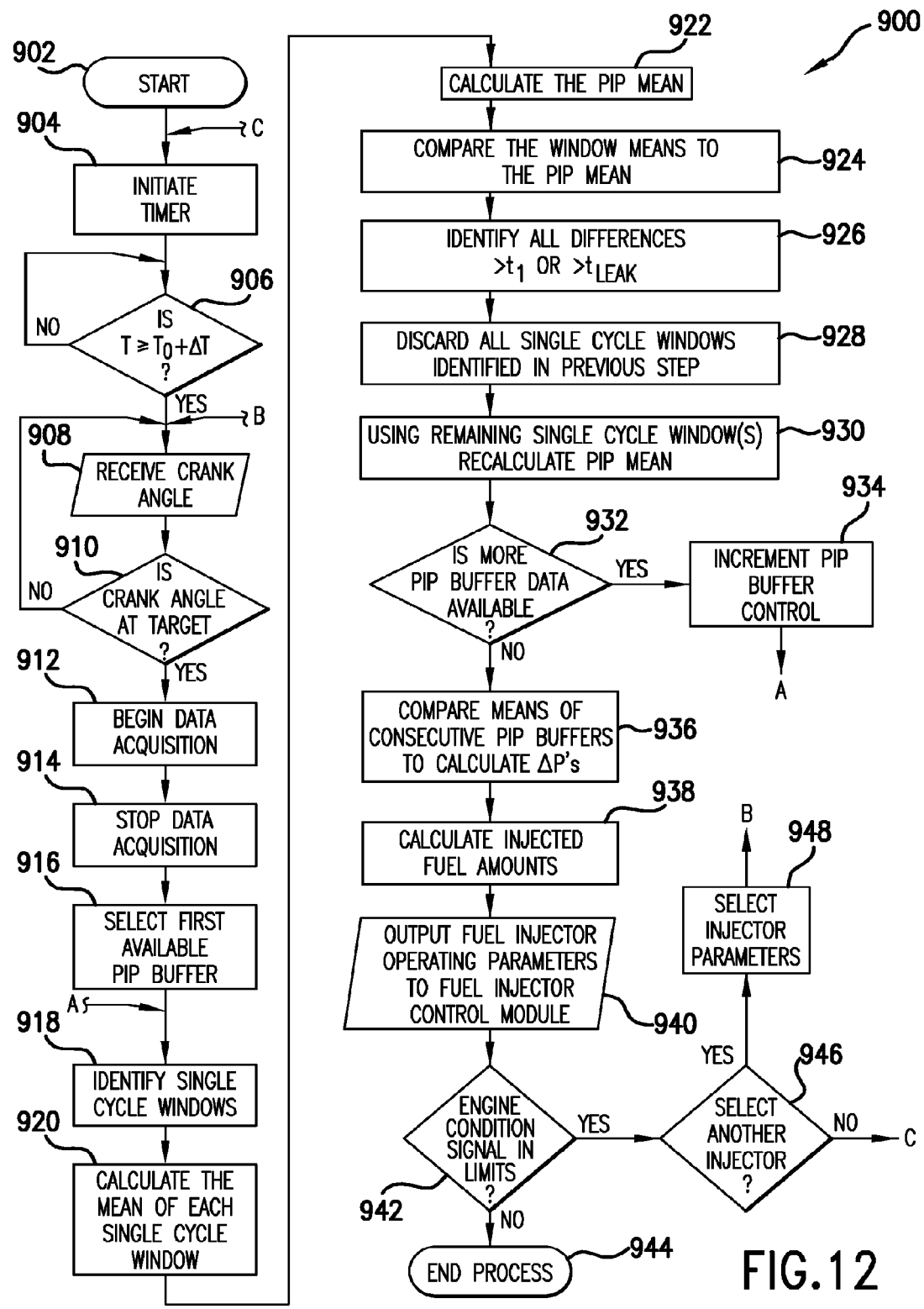
FIG. 12 is a process flow diagram for a data acquisition process of the engine of FIG. 1 in accordance with an exemplary embodiment of the present disclosure.

Referring to FIG. 12, at a process 924, data acquisition and analysis process 900 compares each individual single cycle mean pressure 514 with the PIP buffer mean pressure 516 to develop differences between each individual single cycle mean pressure 514 and PIP buffer mean pressure 516. At a process 926, each difference is compared with a predetermined threshold $t_1$ and a predetermined threshold $t_{leak1}$, previously described. When process 926 detects any difference greater than $t_1$ or $t_{leak1}$, process 926 identifies the single cycle windows having the difference. Process 900 next moves to a process 928, where all single cycle windows having a difference greater than the predetermined thresholds are discarded from PIP buffer 950, or are otherwise marked or indicated so that the affected single cycle windows are ignored. At a process 930, data acquisition and analysis process 900 recalculates the PIP buffer mean using the single cycle window means remaining at the end of process 928.

At a process 932, data acquisition and analysis process 900 determines whether more PIP buffer data is available for processing. If more PIP buffer data is available, process 900 moves to a process 934, where a PIP buffer counter or other tracking indicator is incremented to permit processing of the next available PIP buffer. Process 900 then returns to process 918, where the processing previously described is performed on the next available PIP buffer. Data acquisition and analysis process 900 will continue to proceed through processes 918 to 934 until all available PIP buffers have been analyzed.

Once all PIP buffers have been analyzed, data acquisition and analysis process 900 moves to a process 936, where the mean pressure of each PIP buffer is compared with the mean pressure of the subsequent PIP buffer to find the difference in pressure between two consecutive PIP buffers. This pressure differential is used at a process 938 to calculate the amount of fuel injected by the fuel injection event between the two consecutive PIP buffers in a known manner. Once all available injection events have been analyzed to determine the amounts of fuel injected, data acquisition and analysis process 900 moves to a process 940. At process 940, process 900 determines whether one or more operating parameters of one or more fuel injectors 38 require adjustment. If one or more operating parameters of one or more fuel injectors 38 require adjustment, then the parameters are generated and transmitted to fuel injector control module 80 at 940.

At a decision process 942, data acquisition and analysis process 900 determines whether the engine condition signal indicates engine 10 is operating acceptably and is continuing to operate, as described hereinabove. If the engine condition signal indicates engine 10 is operating in a manner that would lead to erroneous pressure data from fuel pressure sensor 60, or that engine 10 is shutting down or has shut down, then measurement of fuel delivery by fuel injectors 38 is no longer desirable and may lead to invalid data. In these situations, data acquisition and analysis process 900 ends at a process 944. If engine 10 is continuing to operate, and to operate in a manner that would yield accurate fuel pressure data from fuel pressure sensor 60, data acquisition and analysis process 900 moves to a decision process 946. At decision process 946, data acquisition and analysis process 900 determines whether data for another fuel injector 38 needs to be acquired. If data for another fuel injector 38 needs acquired, data acquisition and analysis process 900 moves to a process 948.

At process 948, parameters for data acquisition centered on another fuel injector are set. For example, if data needs collected for piston #6, which is piston 32, a crank angle for injector #6 is set, after which data acquisition and analysis process 900 returns to process 908 where additional data is collected. Data acquisition and analysis process 900 will continue to return to process 908 until at least one set of data is collected for each fuel injector 38, after which data acquisition and analysis process 900 returns to process 904 by way of decision process 946, where the timer is restarted and data acquisition process 100 continues as previously described.

While data acquisition and analysis process 900 is described in the context of six pistons, data acquisition and analysis process 900 may be used for any number of pistons. The only adjustment required for the process to function properly is to provide the crank angles for firing of the pistons, and the firing order.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

We claim:

1. A fueling method comprising:
   commanding a stop of fuel flow into an accumulator;
   sensing a fuel pressure in the fuel accumulator;
   following said commanding, delivering a quantity of fuel from the fuel accumulator during a first injection event and a second quantity of fuel during a second injection event subsequent to the first injection event;
   acquiring first fuel pressure values indicative of the fuel pressure during a first intermediate pressure period extending between the first injection event and the second injection event, the first pressure values representing contiguous oscillations, each of the contiguous oscillations defining a single cycle window;
   calculating a single cycle window pressure for each of at least two of the single cycle windows; and
   calculating a first pressure for the first intermediate pressure period based on the single cycle window pressures of the at least two of the single cycle windows.

2. The method of claim 1, further comprising acquiring second fuel pressure values indicative of the fuel pressure during a second intermediate pressure period extending after the second injection event, calculating a second pressure for the second intermediate pressure period, and calculating the second quantity of fuel based on the difference between the second pressure and the first pressure.

3. The method of claim 1, wherein the single cycle window pressure comprises the mean of pressure values of a corresponding oscillation.

4. The method of claim 1, further comprising: detecting at least one of a pumping event and a leakage error, and rejecting the calculated second quantity of fuel responsive to said detecting, wherein detecting the pumping event includes determining that the single cycle window pressure for a first single cycle window is greater than the first pressure by a predetermined pumping threshold, and detecting the leakage error includes determining that the single cycle window pressure for the first single cycle window is less than the first pressure by a predetermined leakage error threshold.

5. The method of claim 1, wherein calculating a first pressure comprises averaging single cycle window pressures for at least two single cycle windows positioned at the beginning of the first intermediate pressure period and at least two single cycle windows positioned at the end of the first intermediate pressure period.

6. The method of claim 1, further comprising detecting a pumping event if the single cycle window pressure for a first single cycle window is greater than the first pressure by a first predetermined threshold.

7. The method of claim 6, further comprising confirming the pumping event if the single cycle window pressure for a second single cycle window is greater than the first pressure by a second predetermined threshold.

8. The method of claim 1, further comprising detecting a leakage error when the single cycle window pressure for a first single cycle window is less than the first pressure by a first predetermined threshold.

9. The method of claim 8, further comprising confirming the leakage error if the single cycle window pressure for a second single cycle window is less than the first pressure by a second predetermined threshold.

10. The method of claim 1, wherein the contiguous oscillations comprise a frequency and each of the single cycle windows has the same width based on said frequency.

11. The method of claim 1, wherein the first injection event comprises an injection event immediately after fuel flow into the accumulator stopped.

12. A fuel system for an internal combustion engine, the system comprising:
    a fuel accumulator positioned to receive a fuel flow;
    a plurality of fuel injectors, each fuel injector operable to deliver a quantity of fuel from the fuel accumulator to one of a plurality of combustion chambers in response to an injection signal, the delivery of fuel by each fuel injector forming an injection event;
    a sensor configured to sense a fuel pressure in the fuel accumulator; and
    a control system structured to:
      command a stop of the fuel flow to the accumulator;
      acquire first fuel pressure values indicative of the fuel pressure during a first intermediate pressure period extending between a first injection event and a second, consecutive, injection event, the first pressure values representing contiguous oscillations, each of the contiguous oscillations defining a single cycle window;
      calculate a single cycle window mean pressure for each of at least two of the single cycle windows; and
      calculate a first mean pressure for the first intermediate pressure period based on the single cycle window mean pressures of the at least two of the single cycle windows.

13. The system of claim 12, wherein the control system is further structured to acquire second fuel pressure values indicative of the fuel pressure during a second intermediate pressure period extending after the second injection event, to calculate a second mean pressure for the second intermediate pressure period, and to calculate an amount of fuel delivered during the second injection event based on the difference between the second mean pressure and the first mean pressure.

14. The system of claim 13, wherein the control system is further structured to detect at least one of a pumping event and a leakage error, and to reject the calculation of the amount of fuel delivered during the second injection event upon detection of at least one of the pumping event and the leakage error,
  wherein the control system detects the pumping event when the single cycle window mean pressure for a first single cycle window is greater than the first mean pressure by a predetermined pumping threshold, and
  wherein the control system detects the leakage error when the single cycle window mean pressure for the first single cycle window is less than the first mean pressure by a predetermined leakage error threshold.

15. The system of claim 12, wherein each single cycle window contains one full oscillation.

16. The system of claim 12, wherein the first intermediate pressure period represents fuel pressure in the fuel accumulator while the flow of fuel to fuel accumulator has stopped.

17. The system of claim 12, wherein the control system is structured to calculate the first mean pressure by averaging single cycle window mean pressures for at least two single cycle windows positioned at the beginning of the first intermediate pressure period and at least two single cycle windows positioned at the end of the first intermediate pressure signal portion.

18. The system of claim 12, wherein the control system is further structured to detect a pumping event when the single cycle window mean pressure for a first single cycle window is greater than the first mean pressure by a first predetermined threshold.

19. The system of claim 18, wherein the control system is further structured to confirm the pumping event when the single cycle window mean pressure for a second single cycle window is greater than the first mean pressure by a second predetermined threshold.

20. The system of claim 19, wherein the second predetermined threshold is smaller than the first predetermined threshold.

21. The system of claim 12, wherein the control system is further structured to detect a leakage error when the single cycle window mean pressure for a first single cycle window is less than the first mean pressure by a first predetermined threshold.

22. The system of claim 21, wherein the control system is further structured to confirm the leakage error when the single cycle window mean pressure for a second single cycle window is less than the first mean pressure by a second predetermined threshold.

23. The system of claim 22, wherein the second predetermined threshold is larger than the first predetermined threshold.

24. The system of claim 12, wherein the contiguous oscillations comprise a frequency and each of the single cycle windows has the same width based on said frequency.

* * * * *